(12) United States Patent
Toukairin

(10) Patent No.: US 8,065,477 B2
(45) Date of Patent: Nov. 22, 2011

(54) DISK APPARATUS AND ADVANCE DATA READING METHOD

(75) Inventor: Norikatsu Toukairin, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 452 days.

(21) Appl. No.: 12/408,720

(22) Filed: Mar. 23, 2009

(65) Prior Publication Data

US 2009/0240878 A1 Sep. 24, 2009

(30) Foreign Application Priority Data

Mar. 21, 2008 (JP) ................................. 2008-074341

(51) Int. Cl.
*G06F 12/00* (2006.01)
(52) U.S. Cl. .......................... 711/112; 711/113; 711/213
(58) Field of Classification Search .......................... None
See application file for complete search history.

(56) References Cited

U.S. PATENT DOCUMENTS

| | | | | | |
|---|---|---|---|---|---|
| 5,412,786 | A | * | 5/1995 | Kusano | 712/240 |
| 5,455,954 | A | * | 10/1995 | Packer | 710/74 |
| 5,557,767 | A | * | 9/1996 | Sukegawa | 711/113 |
| 6,487,126 | B1 | | 11/2002 | Kawahara | |
| 2002/0138692 | A1 | * | 9/2002 | Gerhart | 711/112 |
| 2005/0166012 | A1 | * | 7/2005 | Liu et al. | 711/112 |

FOREIGN PATENT DOCUMENTS

| | | |
|---|---|---|
| JP | 5-053908 A | 3/1993 |
| JP | 6-168119 A | 6/1994 |
| JP | 2001-014109 A | 1/2001 |

* cited by examiner

*Primary Examiner* — Than Nguyen
(74) *Attorney, Agent, or Firm* — Greer, Burns & Crain, Ltd.

(57) ABSTRACT

Upon receipt of a read command or a write command from an external device, a disk apparatus stores an obtained address as a primary address and a secondary address in an address storing unit, increments a counter value of the secondary address, and selects the secondary address of which the counter value indicates the largest number. Upon receipt of the read command for the primary address, the disk apparatus reads data specified by the primary address from a disk and stores it in a buffer memory in advance. Upon receipt of the read command, the disk apparatus sends the data from the buffer to the external device.

5 Claims, 13 Drawing Sheets

| PRIMARY ADDRESS INFORMATION | SECONDARY ADDRESS INFORMATION | COUNTER |
|---|---|---|
| Sadd1/Eadd1 | Sadd2/Eadd2 | 1 |
| Sadd2/Eadd2 | Sadd3/Eadd3 | 1 |
| ⋮ | ⋮ | ... |

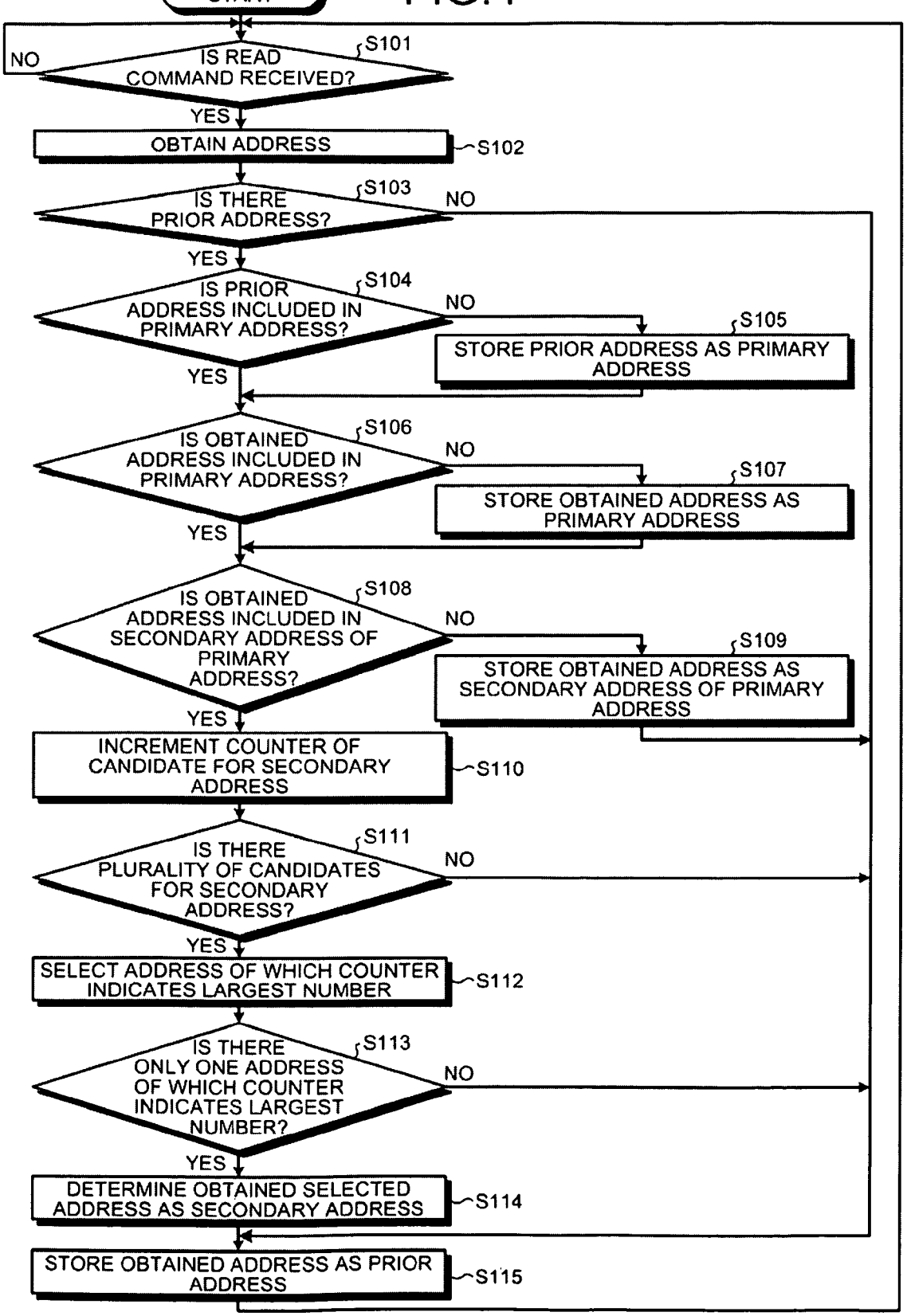

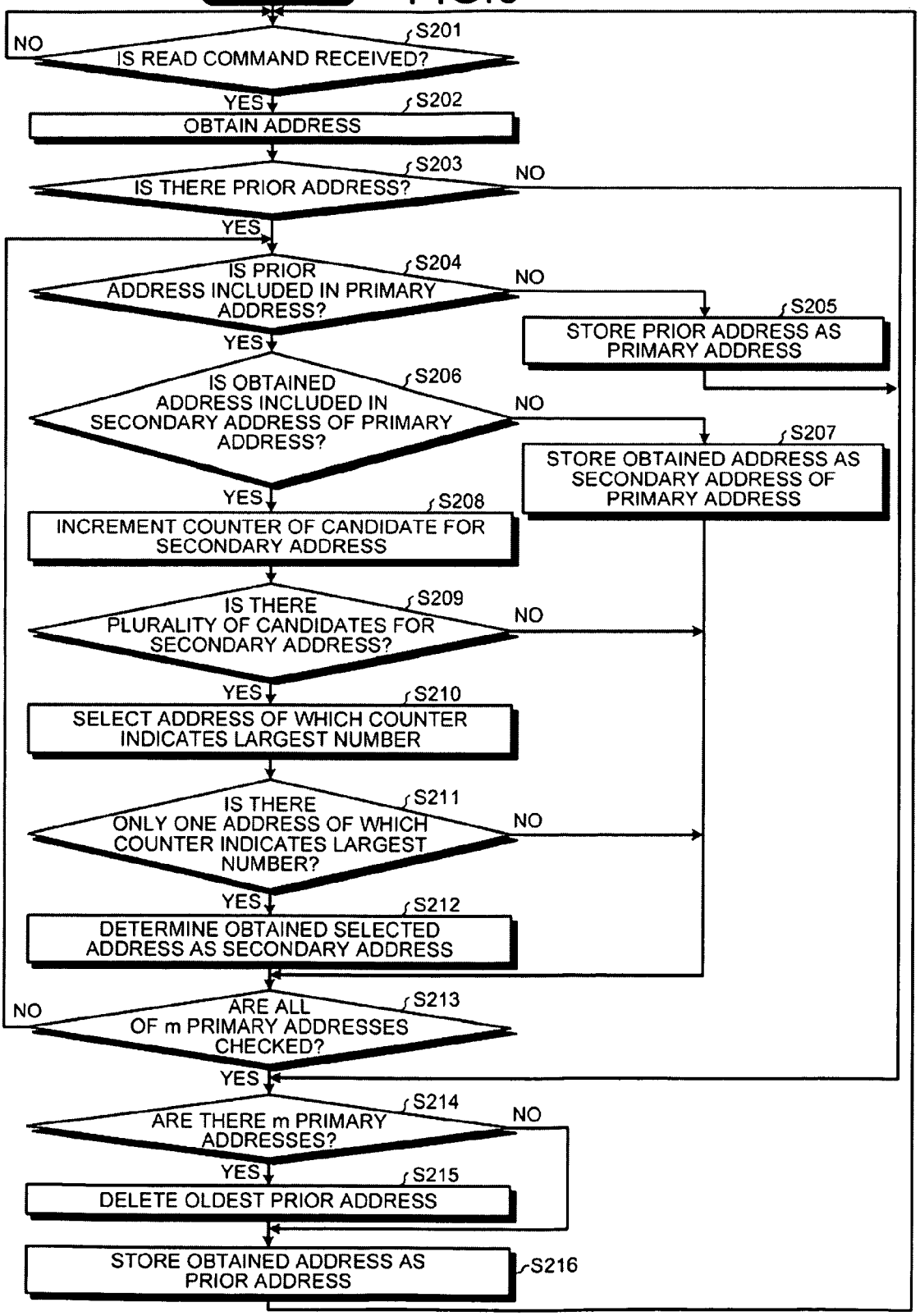

DISK APPARATUS AND ADVANCE DATA READING METHOD

CROSS-REFERENCE TO RELATED APPLICATIONS

This application is based upon and claims the benefit of priority of the prior Japanese Patent Application No. 2008-074341, filed on Mar. 21, 2008, the entire contents of which are incorporated herein by reference.

BACKGROUND

1. Field

The present invention relates to a disc apparatus that reads data from a disk and writes data in the disk based on a command from an external device and to an advance data reading method thereof.

2. Description of the Related Art

A general disk apparatus reads data from a disk in the disk apparatus and writes data in the disk based on a command issued from an external device, such as a host computer. The disk apparatus performs a single reading or writing process per command.

The reading or writing process performed by the general disk apparatus is explained below with reference to FIGS. 10A to 10D. For example, as shown in FIG. 10A, even if a data item consists of α successive bytes on a file, the data item is divided by a maximum frame size of x bytes as long as α is larger than x ($\alpha=x+x+x+y$).

As shown in FIG. 10B, upon receipt of a read command from the host computer, the disk apparatus reads the data based on Startaddress (hereinafter, "Sadd") indicative of a start point of the frame and Endaddress (hereinafter, "Eadd") indicative of an end point of the frame, which are included in the read command.

On the other hand, as shown in FIG. 10C, upon receipt of a write command from the host computer, the disk apparatus writes the data based on the Sadd and the Eadd, which are included in the write command.

The disk stores therein frames specified by the addresses Sadd1/Eadd1, Sadd2/Eadd2, Sadd3/Eadd3, and Sadd4/Eadd4. Even though the four frames originally formed a single data item, the disk apparatus does not always store the frames successively; the frames can be stored separately as shown in FIG. 10D. FIGS. 10A to 10D are schematic diagrams for explaining a process of reading and writing data in a disk apparatus according to a conventional technology.

A process performed by the above disk apparatus is explained below with reference to FIG. 11. Upon receipt of the read command from the host computer (see (1) in FIG. 11), the disk apparatus determines whether a requested data item is stored in a buffer (see (2) in FIG. 11).

If the requested data item is not stored in the buffer, the disk apparatus reads the requested data item in the disk and stores it in the buffer (see (3) and (4) in FIG. 11). The disk apparatus then sends the data item from the buffer to the host computer (see (5) in FIG. 11). On the other hand, if the requested data item is stored in the buffer, the disk apparatus immediately sends the data item from the buffer to the host computer. FIG. 11 is a schematic diagram for explaining a process performed by a configuration of the disk apparatus according to the conventional technology.

With the disk apparatus described above, because the disk apparatus accesses the disk after receiving the read command, it takes a certain time to read the data item. Therefore, to reduce an access time for reading the data, various technologies have been disclosed. For example, Japanese Patent Application Laid-open No. 2001-14109 discloses a disk apparatus that classifies the weight of significance of data items read from a storing medium such as a disk, and that stores the data items in a buffer in the descending order of the weight. Upon receipt of the read command from the host computer, the disk apparatus reads the requested data item from the storing medium, and sends the data item to the host computer. In other words, in the anticipation that the addresses of the requested read command are stored successively, the disk apparatus reads data and store the data in the buffer in advance, and sends the data from the buffer if the addresses are actually successive, thereby increasing throughput rate of the data reading.

However, the disk apparatus described above still requires time to access the data. Specifically, if the continuous frames of the requested data item are not stored at successive addresses, the disc apparatus needs to receive the read command from the host computer before acquiring the data item, and therefore the disk apparatus described above still takes the time to access the data.

SUMMARY

It is an object of the present invention to at least partially solve the problems in the conventional technology.

According to an aspect of an embodiment, a disk apparatus connected to an external device that sends a read command to read data or a write command to write the data, and adapted to read the data from or write the data in a disk in response to the read command or the write command, includes an address storing unit that stores therein a primary address indicative of a start point and an end point of data to be read, which is obtained from the read command or the write command received from the external device, a secondary address indicative of the start point and the end point of data to be read after the data read based on the primary address, and a counter value indicative of a number of times of receiving the read command for the secondary address with respect to the primary address; an address obtaining unit that obtains an address upon receipt of the read command from the external device, and determines whether the obtained address is stored as the primary address in the address storing unit and whether the obtained address is stored as the secondary address of a corresponding primary address in the address storing unit; a primary-address processing unit that, if the address obtained by the address obtaining unit is not stored as the primary address in the address storing unit, stores the obtained address as the primary address in the address storing unit; secondary-address processing unit that, if the address obtained by the address obtaining unit is not stored as the secondary address of the corresponding primary address in the address storing unit, stores the obtained address as the secondary address associated with the corresponding primary address in the address storing unit, after the primary address is stored by the primary-address processing unit; a counter processing unit that, if the address obtained by the address obtaining unit is stored as the secondary address of the corresponding primary address in the address storing unit, increments the counter value of the secondary address, after the secondary-address processing unit stores the obtained address as the secondary address in the address storing unit; a secondary-address selecting unit that selects the secondary address of which the counter value indicates a largest number after the increment of the counter value by the counter processing unit; a reading unit that reads the data based on the secondary address of the corresponding primary address from the disk, and stores the read data in a buffer memory, if the address obtaining unit obtains the address after the secondary-address selecting unit selects the secondary address of the data to be read immediately after the data specified by the primary address; and a sending unit that sends the data of the secondary address stored in the buffer memory by the reading unit to the external device, if the address obtaining unit obtains the secondary address of the data read by the reading unit.

According to another aspect of an embodiment, an advance data reading method for a disk apparatus connected to an external device that sends a read command to read data or a write command to write the data, and adapted to read the data from or write the data in a disk in response to the read command or the write command, includes storing a primary address indicative of a start point and an end point of data to be read, which is obtained from the read command or the write command received from the external device, a secondary address indicative of the start point and the end point of data to be read after the data read based on the primary address, and a counter value indicative of a number of times of receiving the read command for the secondary address with respect to the primary address; obtaining an address upon receipt of the read command from the external device; determining whether the obtained address is stored as the primary address and whether the obtained address is stored as the secondary address of a corresponding primary address; storing, if the obtained address is not stored as the primary address, the obtained address as the primary address; storing, if the obtained address is not stored as the secondary address of the corresponding primary address, the obtained address as the secondary address associated with the corresponding primary address, after the primary address is stored; incrementing, if the obtained address is stored as the secondary address of the corresponding primary address, the counter value of the secondary address, after the obtained address is stored as the secondary address; selecting the secondary address of which the counter value indicates a largest number after the increment of the counter value; reading the data based on the secondary address of the corresponding primary address from the disk, and storing the read data in a buffer memory, if the address is obtained after selecting the secondary address of the data to be read immediately after the data specified by the primary address; and sending the data of the secondary address in the buffer memory to the external device, if the secondary address of the read data is obtained.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 is a flowchart of a secondary-address selecting process performed by the disk apparatus according to the first embodiment;

FIG. 6 is a flowchart of the secondary-address selecting process performed by the disk apparatus according to the second embodiment;

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Figure 1A:
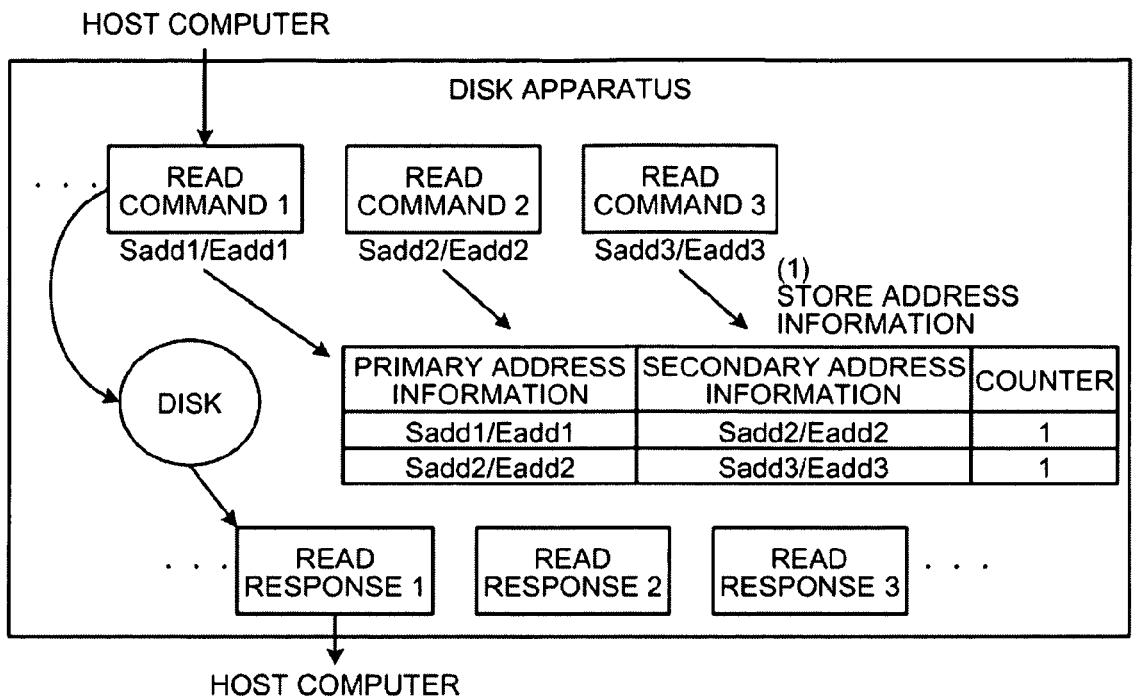
FIGS. 1A to 1C are schematic diagrams for explaining an overview and characteristics of a disk apparatus according to a first embodiment of the present invention.
Figure 1B:
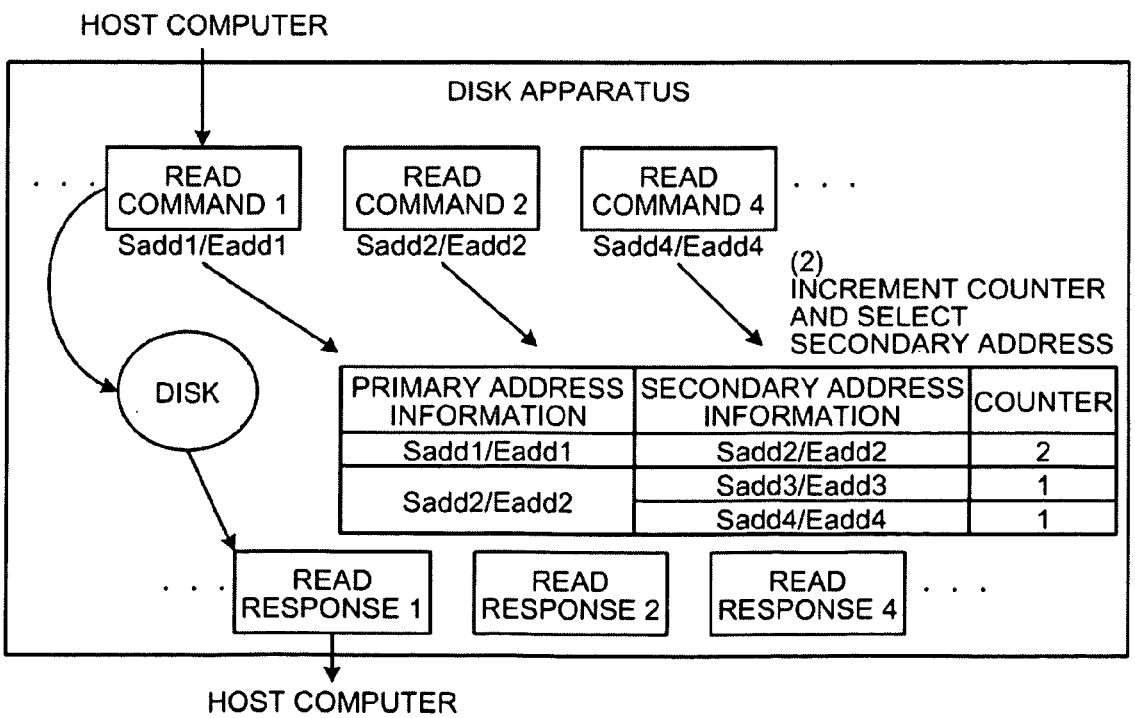
Figure 1C:
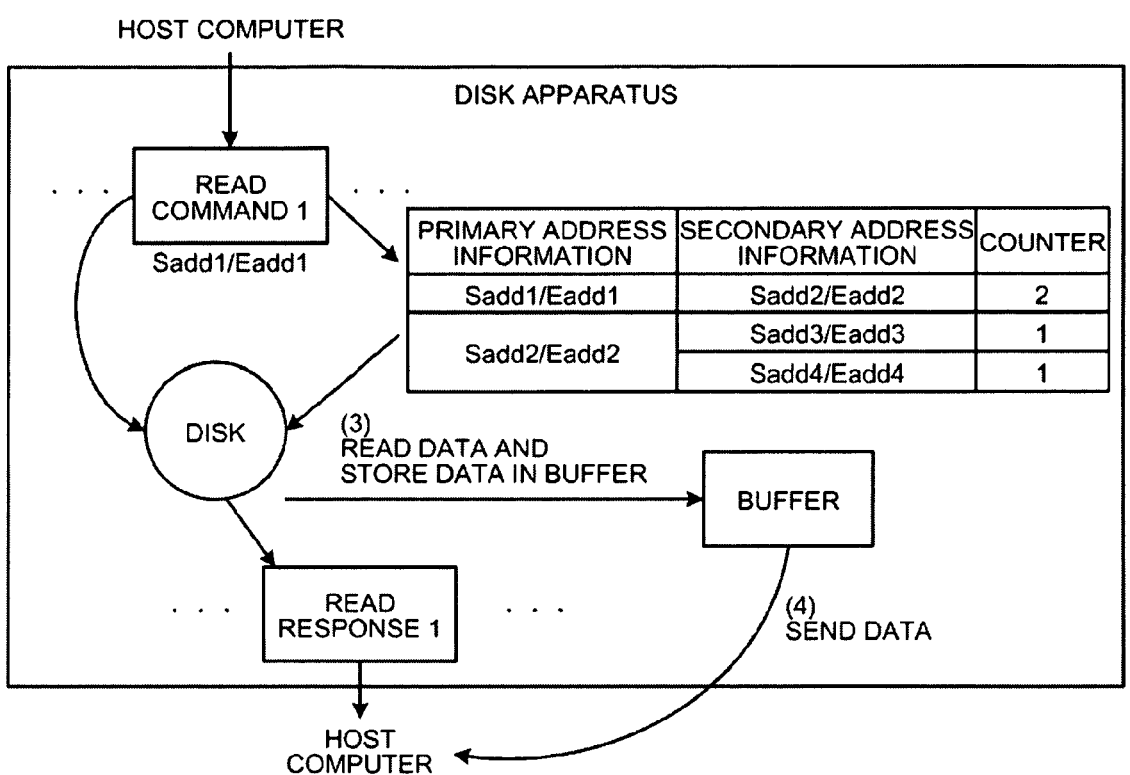

FIGS. 1A to 1C are schematic diagrams for explaining an overview and characteristics of a disk apparatus according to a first embodiment of the present invention.

As shown in FIGS. 1A to 1C, the disk apparatus includes a disk that stores therein data, and receives a command from an external device such as a host computer connected to the disk apparatus to read data from the disk or write data in the disk. Upon receipt of the command, the disk apparatus reads the data from the disk and sends the data to the external device, or writes data received with the command into the disk.

Specifically, the disk apparatus includes an address storing unit that stores therein a primary address, a secondary address, and a counter value. The primary address indicates a start point and an end point of data to be read from the disk, and the primary address is included in the read command. The secondary address indicates an address of data that should be read immediately after the data specified by the primary address. The counter value indicates the number of times of receiving the read command for the secondary address with respect to the primary address.

Upon receipt of the read command from the external device, the disk apparatus obtains an address included in the read command, which indicates the start point and the end point of the data. If the obtained address is not stored as the primary address in the address storing unit, the disk apparatus stores the obtained address as the primary address in the address storing unit. Furthermore, if the obtained address is not stored as the secondary address of the corresponding primary address, the disk apparatus stores the obtained address as the secondary address of the corresponding primary address in the address storing unit (see (1) in FIG. 1A).

More specifically, when the disk apparatus receives a read command 1 from the host computer, the disk apparatus obtains Startaddress (hereinafter, "Sadd") 1 indicative of the start point of the data to be read and Endaddress (hereinafter, "Eadd") 1 indicative of the end point of the data included in the read command 1. The address of the data requested by the read command 1 is collectively referred to as Sadd1/Eadd1, and the same abbreviation is used for other addresses. If the obtained address Sadd1/Eadd1 is not stored as the primary address in the address storing unit, the disk apparatus stores the obtained address Sadd1/Eadd1 as the primary address in the address storing unit.

The disk apparatus then receives a read command 2 from the host computer, and obtains Sadd2 indicative of the start point of the data to be read and Eadd2 indicative of the end point of the data from the read command 2. If the obtained address Sadd2/Eadd2 is not stored as the primary address in the address storing unit, the disk apparatus stores the obtained address Sadd2/Eadd2 as the primary address in the address storing unit.

Furthermore, if the obtained address Sadd2/Eadd2 is not stored as the secondary address of the primary address Sadd1/Eadd1, the disk apparatus stores the obtained address Sadd2/Eadd2 as the secondary address of the primary address Sadd1/Eadd1 in the address storing unit.

The disk apparatus then receives a read command 3 from the host computer, and obtains Sadd3 indicative of the start point of the data to be read and Eadd3 indicative of the end point of the data from the read command 3. If the obtained address Sadd3/Eadd3 is not stored as the primary address in the address storing unit, the disk apparatus stores the obtained address Sadd3/Eadd3 as the primary address in the address storing unit.

If the obtained address Sadd3/Eadd3 is not stored as the secondary address of the primary address Sadd2/Eadd2 in the address storing unit, the disk apparatus stores the obtained address Sadd3/Eadd3 as the secondary address of the primary address Sadd2/Eadd2 in the address storing unit.

If the obtained address is stored as the secondary address of the corresponding primary address, the disk apparatus increments the counter value of the secondary address in the address storing unit, and selects a secondary address of which the counter value indicates the largest number based on the counter value of the secondary address (see (2) in FIG. 1B).

More specifically, when the disk apparatus receives the read command 2 from the host computer after receiving the read command 1, the disk apparatus obtains Sadd2 indicative of the start point of the data to be read and Eadd2 indicative of the end point of the data from the read command 2.

If the obtained address Sadd2/Eadd2 is stored as the secondary address of the primary address Sadd1/Eadd1 in the address storing unit, the disk apparatus increments the counter value of the secondary address from one to two. The disk apparatus then selects the obtained address Sadd2/Eadd2, of which the counter value indicates the largest number, as the secondary address of the primary address Sadd1/Eadd1.

If a new address is obtained after selection of the secondary address, the disk apparatus reads the data of the secondary address of the obtained address and stores it in the buffer (see (3) in FIG. 1C).

More specifically, if the disk apparatus receives the read command 1 from the host computer after selecting the secondary address Sadd2/Eadd2 to be read after the primary address Sadd1·Eadd1, the disk apparatus reads the data of the secondary address Sadd2/Eadd2 from the disk and stores the data in the buffer in advance.

If the disk apparatus obtains an address identical to the secondary address of which data is read in advance, the disk apparatus sends the data of the secondary address from the buffer to the external device (see (4) in FIG. 1C).

More specifically, if the disk apparatus receives the read command 2 from the host computer and obtains the address Sadd2/Eadd2 from the read command 2, the disk apparatus sends the data of the secondary address Sadd2/Eadd2 from the buffer to the host computer.

By repeating the above process, the disk apparatus selects the secondary address corresponding to the primary address Sadd2/Eadd2. For example, the disk apparatus selects the secondary address Sadd3/Eadd3 corresponding to the primary address Sadd2/Eadd2. If the disk apparatus receives the read command 2 from the host computer, the disk apparatus reads data of the secondary address Sadd3/Eadd3 from the disk and stores it in the buffer in advance. When the disk apparatus receives the read command 3 from the host computer immediately after the read command 2, the disk apparatus sends the data from the buffer to the host computer.

In this manner, because the disk apparatus according to the first embodiment reads the data from the disk in advance, the time to access the data can be reduced.

More specifically, the disk apparatus selects the secondary address corresponding to the primary address in the read command received from the external device, and reads the data of the secondary address before receiving the following read command from the external device. Therefore, compared with the conventional disk apparatus that reads data in advance only if the addresses of the requested data are stored at successive addresses, the disk apparatus can reduce the time to access the data no matter the addresses are successive.

Figures 2, 3:
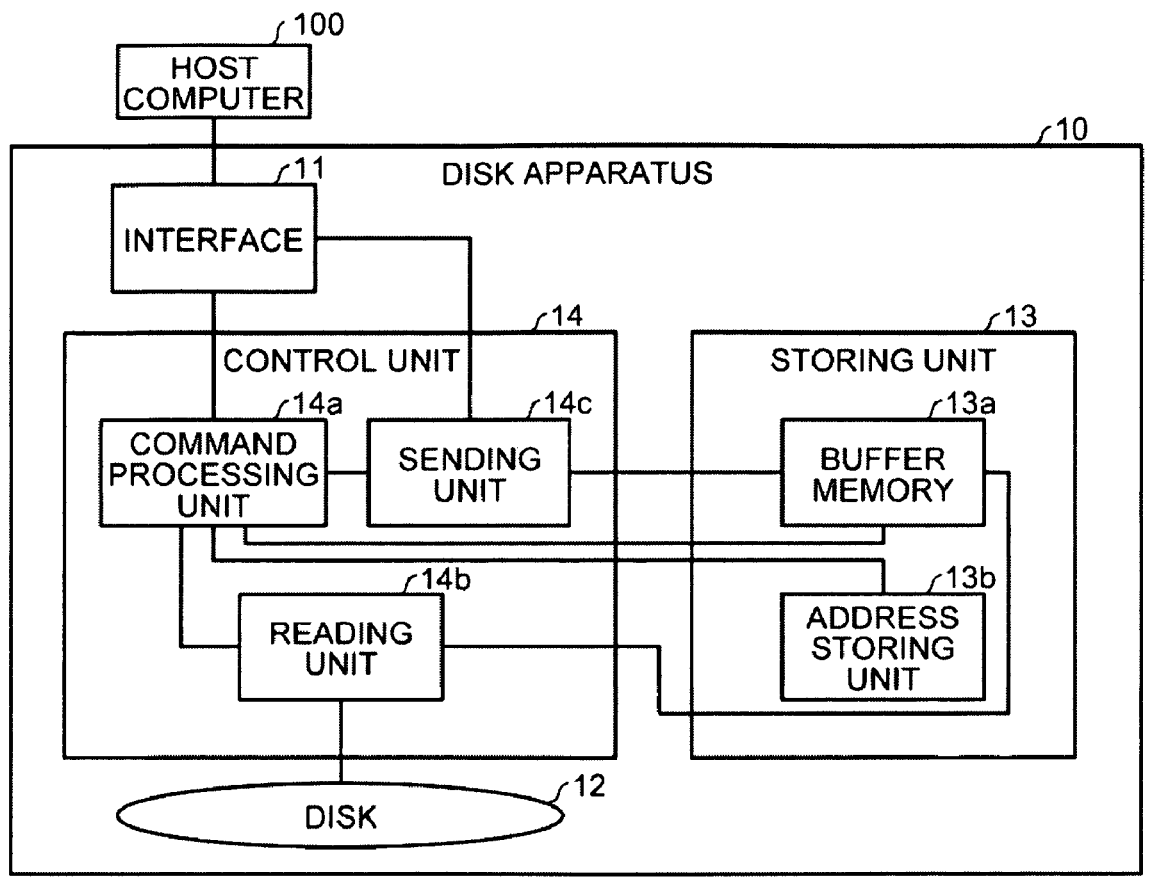
FIG. 2 is a block diagram of the disk apparatus according to the first embodiment.
FIG. 3 is an example of address information stored in an address storing unit shown in FIG. 2.

Next, a configuration of the disk apparatus 10 according to the first embodiment will be explained with reference to FIG. 2. FIG. 2 is a block diagram of a disk apparatus 10 according to the first embodiment.

As shown in FIG. 2, the disk apparatus 10 includes an interface (I/F) 11, a disk 12, a storing unit 13, and a control unit 14, and it is connected to a host computer 100. The disk apparatus 10 reads data from the disk 12 and writes data in the disk 12 in response to a command from the host computer 100.

The interface 11 is, for example, compliant with advanced technology attachment (ATA) standards, and used to communicate with the host computer 100. For example, the disk apparatus 10 receives read commands, write commands, files, and data from the host computer 100 via the interface 11, and sends files and data to the host computer 100 via the interface 11 based on the ATA standards.

The disk 12 stores therein various applications and data. For example, the disk 12 stores therein data divided into a predetermined maximum frame size in a successive or non-successive manner. Each of the divided data frames has its Sadd indicative of the start point of the data and its Eadd indicative of the end point of the data. The disk apparatus 10 reads the data based on the address described as Sadd1/Eadd1, Sadd2/Eadd2, or the like.

The storing unit 13 stores therein data required for various processes performed by the control unit 14 and the results of the processes by the control unit 14, and includes a buffer memory 13a and an address storing unit 13b. Furthermore, the storing unit 13 temporarily stores an order of receiving the write commands and the read commands from the host computer 100.

The buffer memory 13a stores therein data that a reading unit 14b, which will be described later, reads from the disk 12. For example, the buffer memory 13a stores therein the applications and data read from the disk 12.

The address storing unit 13b stores therein address information indicative of the start and end points of the data to be read based on the received read command from the host computer 100, the primary address, the secondary address, and the counter value.

More specifically, as shown in FIG. 3, the address storing unit 13b stores therein the address information Sadd/Eadd having Sadd indicative of the start point and Eadd indicative of the end point of the data to be read included in the read command received from the host computer 100. FIG. 3 is an example of the address storing unit 13a.

A detailed explanation of the address information will be given. The address storing unit 13b stores therein the primary address Sadd1/Eadd1 indicative of the data to be read, the secondary address Sadd2/Eadd2 to be read next, and the counter value that indicates one, meaning that the secondary address Sadd2/Eadd2 was requested after the primary address Sadd1/Eadd1 for one time.

The address storing unit 13b is a nonvolatile memory that retains the data therein even if the disk apparatus 10 is turned off, and it can be a storing device such as a solid state drive (SSD).

The control unit 14 includes a command processing unit 14a, the reading unit 14b, a sending unit 14c, and a memory that stores therein a control program, a program that describes processing procedures, and various data, to perform various processings.

Upon receipt of a read command from the host computer 100, the command processing unit 14a obtains an address indicative of the start and end points of the data to be read included in the read command. If the obtained address is not stored as the primary address in the address storing unit 13b, the command processing unit 14a stores the obtained address as the primary address in the address storing unit 13b. If the obtained address is not stored as the secondary address in the address storing unit 13b, the command processing unit 14a stores the obtained address as the secondary address of the corresponding primary address in the address storing unit 13b.

For example, upon receipt of the read command 1 from the host computer 100, the command processing unit 14a obtains the address Sadd1 and Eadd1 indicative of the start and end points of the data to be read included in the read command 1. If the obtained address Sadd1/Eadd1 is not stored as the primary address in the address storing unit 13b, the command processing unit 14a stores the obtained address Sadd1/Eadd1 as the primary address in the address storing unit 13b.

Upon receipt of the following read command 2 from the host computer 100, the command processing unit 14a obtains the address Sadd2 and Eadd2 indicative of the start and end points of the data to be read included in the read command 2. If the obtained address Sadd2/Eadd2 is not stored as the primary address in the address storing unit 13b, the command processing unit 14a stores the obtained address Sadd2/Eadd2 as the primary address in the address storing unit 13b.

Furthermore, if the obtained address Sadd2/Eadd2 is not stored as the secondary address of the primary address Sadd1/Eadd1, the command processing unit 14a stores the obtained address Sadd2/Eadd2 as the secondary address of the primary address Sadd1/Eadd1 in the address storing unit 13b.

To see whether the disk apparatus 10 received the read command 1 (for example, the address Sadd1/Eadd1) before receipt of the read command 2 (for example, the address Sadd2/Eadd2), the command processing unit 14a only needs to check the order of receiving the read commands from the host computer 100 temporarily stored in the storing unit 13.

Upon receipt of the read command 3 from the host computer 100, the command processing unit 14a obtains Sadd3 and Eadd3 indicative of the start and end points of the data to be read included in the read command 3. If the obtained address Sadd3/Eadd3 is not stored as the primary address in the address storing unit 13b, the command processing unit 14a stores the obtained address Sadd3/Eadd3 as the primary address in the address storing unit 13b.

Furthermore, if the obtained address Sadd3/Eadd3 is not stored as the secondary address of the primary address Sadd2/Eadd2, the command processing unit 14a stores the obtained address Sadd3/Eadd3 as the secondary address of the primary address Sadd2/Eadd2 in the address storing unit 13b.

If the obtained address is stored as the secondary address of the corresponding primary address in the address storing unit 13b, the command processing unit 14a increments the counter value of the secondary address.

More specifically, when the disk apparatus 10 receives the read command 2 after receiving the read command 1, the command processing unit 14a obtains Sadd2/Sadd2 indicative of the start and end points of the data to be read included in the read command 2.

If the obtained address Sadd2/Eadd2 is stored as the secondary address of the primary address Sadd1/Eadd1 in the address storing unit 13b, the command processing unit 14a increments the counter value of the secondary address from one to two.

The command processing unit 14a then selects the secondary address of which the counter value indicates the largest number.

More specifically, the command processing unit 14a selects the secondary address Sadd2/Eadd2, of which the counter value indicates the largest number, as the secondary address of the primary address Sadd1/Eadd1. If the secondary address cannot be selected for the secondary address of the primary address, for example, if there is a plurality of candidates, the command processing unit 14a determines that there is not a successive data, so that the command processing unit 14a does not use the secondary addresses for reading data in advance, or deletes the address.

If a new address is obtained after selection of the secondary address, the reading unit 14b reads the data of the secondary address of the obtained address from the disk 12 and stores the data in the buffer memory 13a.

More specifically, if the disk apparatus 10 receives the read command 1 from the host computer 100 after selecting the secondary address Sadd2/Eadd2 to be read after the primary address Sadd1/Eadd1, the reading unit 14b reads the data of the secondary address Sadd2/Eadd2 from the disk 12 and stores the data in the buffer memory 13a in advance.

If the disk apparatus 10 obtains an address identical to the secondary address of which data is read in advance, the sending unit 14c sends the data of the secondary address from the buffer memory 13a to the host computer 100.

More specifically, if the disk apparatus 10 receives the read command 2 from the host computer 100 and obtains the address Sadd2/Eadd2 included in the read command 2, the sending unit 14c sends the data based on the secondary address Sadd2/Eadd2 from the buffer memory 13a to the host computer 100.

Next, a secondary-address selecting process performed by the disk apparatus 10 according to the first embodiment will be explained with reference to FIG. 4. FIG. 4 is a flowchart of the secondary-address selecting process performed by the disk apparatus 10.

Upon receipt of the read command 1 from the host computer 100 (YES at Step S101) as shown in FIG. 4, the disk apparatus 10 obtains Sadd1 indicative of the start point of the data to be read and Eadd1 indicative of the end point of the data, included in the read command 1 (Step S102).

The disk apparatus 10 determines whether any prior address has been obtained from a read command received from the host computer 100 prior to the read command 1 (Step S103). If there is not any prior address (NO at Step S103), the disk apparatus 10 stores the obtained address Sadd1/Eadd1 in the storing unit 13 as the prior address (Step S115).

Upon receipt of the read command 2 from the host computer 100 later (YES at Step S101), disk apparatus 10 obtains Sadd2 indicative of the start point of the data to be read and Eadd2 indicative of the end point of the data, included in the read command 2 (Step S102).

The disk apparatus 10 determines whether any prior address has been obtained from the read command received from the host computer 100 prior to the read command 2 (Step S103). If the prior address Sadd1/Eadd1 is stored in the storing unit 13 (YES at Step S103), the disk apparatus 10 determines whether the address storing unit 13b stores therein the prior address Sadd1/Eadd1 as the primary address (Step S104).

If the prior address Sadd1/Eadd1 is not stored as the primary address in the address storing unit 13b (NO at Step S104), the disk apparatus 10 stores the prior address Sadd1/Eadd1 as the primary address in the address storing unit 13b (Step S105).

The disk apparatus 10 determines whether the obtained address Sadd2/Eadd2 is stored as the primary address in the address storing unit 13b (Step S106). If the obtained address Sadd2/Eadd2 is not stored as the primary address in the address storing unit 13b (NO at Step S106), the disk apparatus 10 stores the obtained address Sadd2/Eadd2 as the primary address in the address storing unit 13b (Step S107).

The disk apparatus 10 determines whether the obtained address Sadd2/Eadd2 is stored as the secondary address of the primary address Sadd1/Eadd1 in the address storing unit 13b (Step S108). If the obtained address Sadd2/Eadd2 is not stored as the secondary address of the primary address Sadd1/Eadd1 in the address storing unit 13b (NO at Step S108), the disk apparatus 10 stores the obtained address Sadd2/Eadd2 as the secondary address of the primary address Sadd1/Eadd1 in the address storing unit 13b (Step S109). The disk apparatus 10 then stores the obtained address Sadd2/Eadd2 as the prior address in the storing unit 13 (Step S115).

Upon receipt of the read command 3 from the host computer 100 later (YES at Step S101), the disk apparatus 10 obtains Sadd3 indicative of the start point of the data to be read and Eadd3 indicative of the end point of the data, included in the read command 3 (Step S102).

The disk apparatus 10 determines whether any prior address has been obtained from the read command received from the host computer 100 prior to the read command 3 (Step S103). If the prior address Sadd2/Eadd2 is stored in the storing unit 13 (YES at Step S103), the disk apparatus 10 determines whether the address storing unit 13b stores therein the prior address Sadd2/Eadd2 as the primary address (Step S104).

If the prior address Sadd2/Eadd2 is not stored as the primary address in the address storing unit 13b (NO at Step S104), the disk apparatus 10 stores the prior address Sadd2/Eadd2 as the primary address in the address storing unit 13b (Step S105).

The disk apparatus 10 determines whether the obtained address Sadd3/Eadd3 is stored as the primary address in the address storing unit 13b (Step S106). If the obtained address Sadd3/Eadd3 is not stored as the primary address in the address storing unit 13b (NO at Step S106), the disk apparatus 10 stores the obtained address Sadd3/Eadd3 as the primary address in the address storing unit 13b (Step S107).

The disk apparatus 10 determines whether the obtained address Sadd3/Eadd3 is stored as the secondary address of the primary address Sadd2/Eadd2 in the address storing unit 13b (Step S108). If the obtained address Sadd3/Eadd3 is not stored as the secondary address of the primary address Sadd2/Eadd2 in the address storing unit 13b (NO at Step S108), the disk apparatus 10 stores the obtained address Sadd3/Eadd3 as the secondary address of the primary address Sadd2/Eadd2 in the address storing unit 13b (Step S109).

When the disk apparatus 10 receives the read command 2 after receiving the read command 1 (YES at Step S101), the disk apparatus 10 obtains Sadd2 indicative of the start point of the data to be read and Eadd2 indicative of the end point of the data, included in the read command 2 (Step S102).

The disk apparatus 10 determines whether any prior address has been obtained from the read command received from the host computer 100 prior to the read command 2 (Step S103). If the prior address Sadd1/Eadd1 is stored in the storing unit 13 (YES at Step S103), the disk apparatus 10 determines whether the address storing unit 13b stores therein the prior address Sadd1/Eadd1 as the primary address (Step S104).

If the prior address Sadd1/Eadd1 is stored as the primary address in the address storing unit 13b (YES at Step S104), the disk apparatus 10 determines whether the obtained address Sadd2/Eadd2 is stored as the primary address in the address storing unit 13b (Step S106).

If the obtained address Sadd2/Eadd2 is stored as the primary address in the address storing unit 13b (YES at Step S106), the disk apparatus 10 determines whether the obtained address Sadd2/Eadd2 is stored as the secondary address of the primary address Sadd1/Eadd1 in the address storing unit 13b (Step S108).

If the obtained address Sadd2/Eadd2 is stored as the secondary address (YES at Step S108), the disk apparatus 10 increments the counter value of the secondary address Sadd2/Eadd2 from one to two (Step S110). The disk apparatus 10 then determines whether there is a plurality of candidates for the secondary address (Step S111).

If there is not a plurality of candidates for the secondary address (NO at Step S111), the disk apparatus 10 stores the obtained address Sadd2/Eadd2 as the prior address in the storing unit 13 (Step S115).

If there is a plurality of candidates for the secondary address (YES at Step S111), the disk apparatus 10 calculates an address of which the counter value in the address storing unit 13b indicates the largest number (Step S112). The disk apparatus 10 determines whether there is only one address of which the counter value in the address storing unit 13b indicates the largest number (Step S113). If there is only one such address (YES at Step S113), the disk apparatus 10 selects the address Sadd2/Eadd2 as the secondary address of the prior address Sadd1/Eadd1 (Step S114).

By repeating the address registering process with respect to the address storing unit 13b described above, the disk apparatus 10 selects the secondary address. If the disk apparatus 10 receives the read command 1 from the host computer 100 after selecting the address Sadd2/Eadd2 as the secondary address, the disk apparatus 10 reads the data of the secondary address Sadd2/Eadd2 from the disk 12 and stores the data in the buffer memory 13a in advance. Upon receipt of the read command 2 from the host computer 100, the disk apparatus 10 sends the data from the buffer memory 13a to the host computer 100.

In this manner, because the disk apparatus 10 according to the first embodiment, which is connected to the external device that can issue read/write commands, reads the data from the disk 12 and stores it in the buffer memory 13a in advance in accordance with the read/write commands issued from the external device, the time to access the data can be reduced.

More specifically, the disk apparatus 10 stores therein the primary address, the secondary address, and the counter value. The primary address indicates a start point and an end point of data to be read from the disk, and the primary address is included in the read command. The secondary address indicates an address of data that should be read immediately after the data specified by the primary address. The counter value indicates the number of times of receiving the read command for the secondary address with respect to the primary address. The disk apparatus 10 obtains the address from the read command received from the host computer 100, and, if the obtained address is not stored as the primary address, the disk apparatus 10 stores the obtained address as the primary address. If the obtained address is not stored as the secondary address for the corresponding primary address, the disk apparatus 10 stores the obtained address as the secondary address. On the contrary, if the obtained address is stored as the secondary address for the corresponding primary address, the disk apparatus 10 increments the counter value of the secondary address. The disk apparatus 10 then selects the secondary address of which the counter value indicates the largest number. If the address is obtained after the secondary address is selected, the disk apparatus 10 reads the data of the secondary address and stores the data in the buffer memory 13a. If the disk apparatus 10 obtains an address identical to the secondary address of which data is read in advance, the disk apparatus 10 sends the data of the secondary address from the buffer memory 13a to the host computer 100. As a result, the disk apparatus 10 can reduce the time to access the data.

The disk apparatus according to the first embodiment determines whether a data requested by a read command continues from another data requested by a previous read command. However, the disk apparatus can be configured to check a predetermined number n of data to see if they continue from the data requested by the previous read command.

Figure 5A:
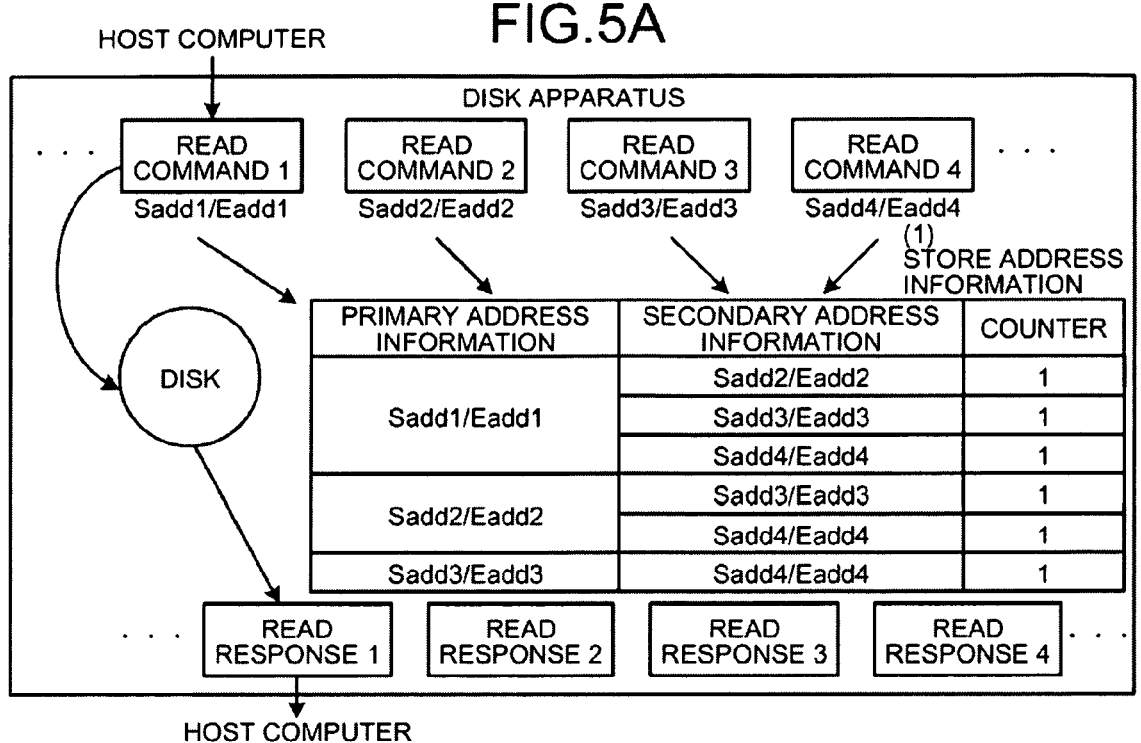
FIGS. 5A to 5C are schematic diagrams for explaining an overview and characteristics of a disk apparatus according to a second embodiment of the present invention.
Figure 5B:
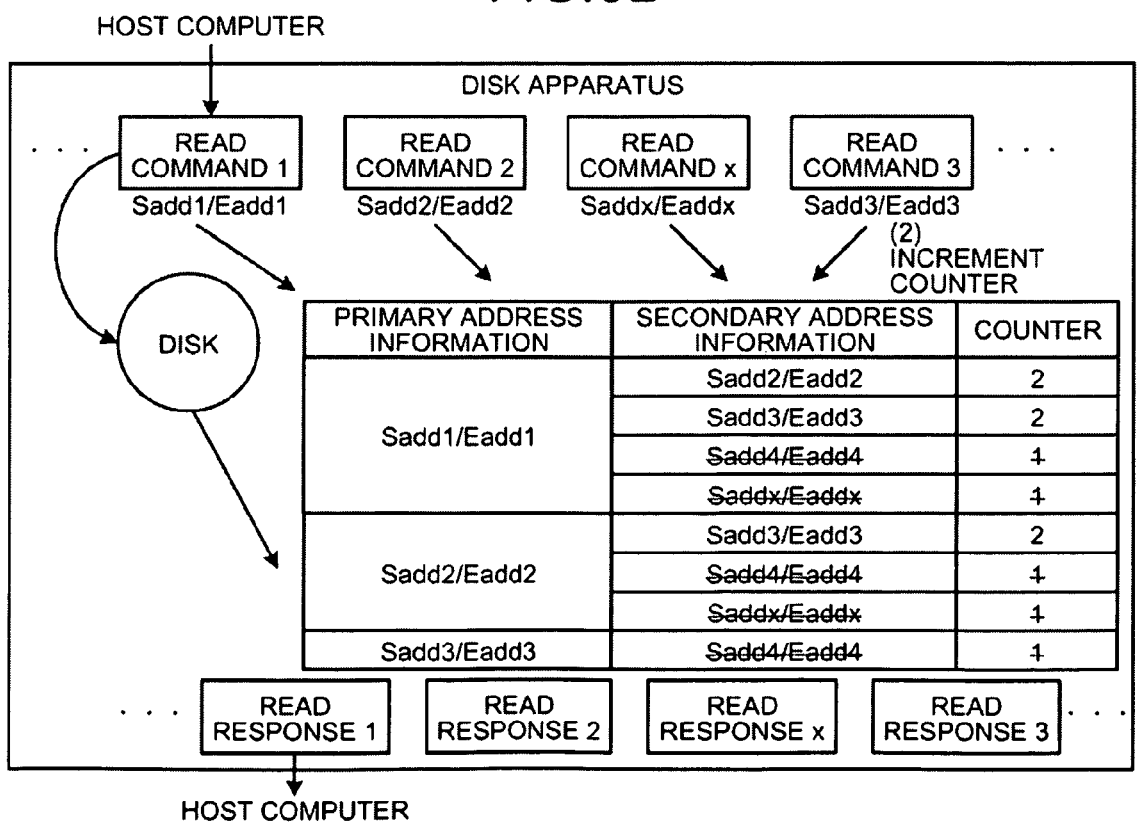
Figure 5C:
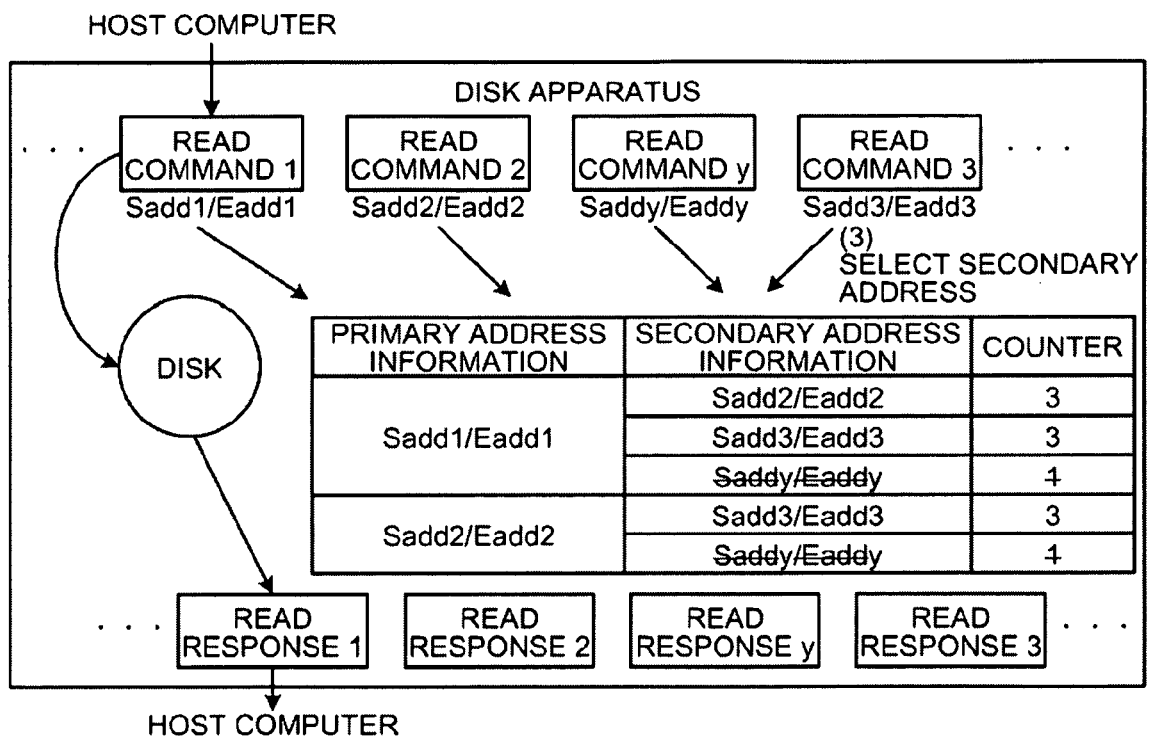

FIGS. 5A to 5C are schematic diagrams for explaining an overview and characteristics of a disk apparatus according to a second embodiment of the present invention. FIG. 6 is a flowchart of the secondary-address selecting process performed by the disk apparatus according to the second embodiment. Because the disk apparatus 10 according to the second embodiment has the same configuration as the disk apparatus according to the first embodiment, the explanation thereof is omitted, and an explanation is given focusing on the process of storing and selecting the secondary address, which is different from the process in the first embodiment, using the same reference numerals as in the first embodiment. Although the predetermined number n is three and four read commands are received in the following explanation, the present invention is not limited to check three commands.

As shown in FIG. 5A, upon receipt of the read command from the external device, the disk apparatus 10 obtains an address included in the read command, which indicates the start point and the end point of data to be read. If the obtained address is not stored as the primary address in the address storing unit, the disk apparatus 10 stores the obtained address as the primary address in the address storing unit. Furthermore, if the obtained address is not stored as the secondary address, the disk apparatus 10 stores the obtained address up to the predetermined number as the secondary address of the corresponding primary address in the address storing unit (see (1) in FIG. 5A).

More specifically, when the disk apparatus 10 receives the read command 1 from the host computer 100, the disk apparatus 10 obtains Sadd1 indicative of the start point of the data to be read and Eadd1 indicative of the end point of the data, included in the read command 1. If the obtained address Sadd1/Eadd1 is not stored as the primary address in the address storing unit 13b, the disk apparatus 10 stores the obtained address Sadd1/Eadd1 as the primary address in the address storing unit 13b.

When the disk apparatus 10 then receives the read command 2 from the host computer 100, the disk apparatus 10 obtains Sadd2 indicative of the start point of the data to be read and Eadd2 indicative of the end point of the data, included in the read command 2. If the obtained address Sadd2/Eadd2 is not stored as the primary address in the address storing unit 13b, the disk apparatus 10 stores the obtained address Sadd2/Eadd2 as the primary address in the address storing unit 13b.

Furthermore, if the obtained address Sadd2/Eadd2 is not stored as the secondary address of the primary address Sadd1/Eadd1, the disk apparatus 10 stores the obtained address Sadd2/Eadd2 as the secondary address of the primary address Sadd1/Eadd1 in the address storing unit 13b.

The disk apparatus 10 then receives the read command 3 from the host computer 100, and obtains Sadd3 indicative of the start point of the data to be read and Eadd3 indicative of the end point of the data, included in the read command 3. If the obtained address Sadd3/Eadd3 is not stored as the primary address in the address storing unit 13b, the disk apparatus 10 stores the obtained address Sadd3/Eadd3 as the primary address in the address storing unit 13b.

If the obtained address Sadd3/Eadd3 is not stored as the secondary address of the primary address Sadd1/Eadd1 in the address storing unit 13b, the disk apparatus 10 stores the obtained address Sadd3/Eadd3 as the secondary address of the primary address Sadd1/Eadd1 in the address storing unit 13b.

Furthermore, if the obtained address Sadd3/Eadd3 is not stored as the secondary address of the primary address Sadd2/Eadd2 in the address storing unit 13b, the disk apparatus 10 stores the obtained address Sadd3/Eadd3 as the secondary address of the primary address Sadd2/Eadd2 in the address storing unit 13b.

The disk apparatus 10 then receives a read command 4 from the host computer 100, and obtains Sadd4 indicative of the start point of the data to be read and Eadd4 indicative of the end point of the data, included in the read command 4. If the obtained address Sadd4/Eadd4 is not stored as the primary address in the address storing unit 13b, the disk apparatus 10 stores the obtained address Sadd4/Eadd4 as the primary address in the address storing unit 13b.

If the obtained address Sadd4/Eadd4 is not stored as the secondary address of the primary address Sadd1/Eadd1 in the address storing unit 13b, the disk apparatus 10 stores the obtained address Sadd4/Eadd4 as the secondary address of the primary address Sadd1/Eadd1 in the address storing unit 13b.

If the obtained address Sadd4/Eadd4 is not stored as the secondary address of the primary address Sadd2/Eadd2 in the address storing unit 13b, the disk apparatus 10 stores the obtained address Sadd4/Eadd4 as the secondary address of the primary address Sadd2/Eadd2 in the address storing unit 13b.

If the obtained address Sadd4/Eadd4 is not stored as the secondary address of the primary address Sadd3/Eadd3 in the address storing unit 13b, the disk apparatus 10 stores the obtained address Sadd4/Eadd4 as the secondary address of the primary address Sadd3/Eadd3 in the address storing unit 13b.

If the obtained address is stored as the secondary address of the corresponding primary address in the address storing unit 13b, the disk apparatus 10 increments the counter value of the secondary address (see (2) in FIG. 5B).

More specifically, when the disk apparatus 10 receives the read command 2 from the host computer 100 after receiving the read command 1, the disk apparatus 10 obtains Sadd2 indicative of the start point of the data to be read and Eadd2 indicative of the end point of the data, included in the read command 2.

If the obtained address Sadd2/Eadd2 is stored as the secondary address of the primary address Sadd1/Eadd1 in the address storing unit 13b, the disk apparatus 10 increments the counter value of the secondary address in the address storing unit 13b from one to two.

When the disk apparatus 10 receives a read command x from the host computer 100 after receiving the read command 1 and the read command 2, the disk apparatus obtains Saddx indicative of the start point of the data to be read and Eaddx indicative of the end point of the data, included in the read command x. The disk apparatus 10 then stores the obtained address Saddx/Eaddx as the secondary address of the primary addresses Sadd1/Eadd1 and Sadd2/Eadd2 in the address storing unit 13b.

When the disk apparatus 10 receives the read command 3 from the host computer 100 after receiving the read command 1, the read command 2, and the read command x, the disk apparatus 10 obtains Sadd3 indicative of the start point of the data to be read and Eadd3 indicative of the end point of the data, included in the read command 3.

If the obtained address Sadd3/Eadd3 is stored as the secondary address of the primary addresses Sadd1/Eadd1 and Sadd2/Eadd2 in the address storing unit 13b, the disk apparatus 10 increments the counter value of the secondary address in the address storing unit 13b from one to two.

The disk apparatus 10 then selects a secondary address of which the counter value indicates the largest number (see (3) in FIG. 5C).

More specifically, when the disk apparatus 10 receives the read command 2 from the host computer 100 after receiving the read command 1, the disk apparatus 10 obtains Sadd2 indicative of the start point of the data to be read and Eadd2 indicative of the end point of the data, included in the read command 2.

If the obtained address Sadd2/Eadd2 is stored as the secondary address of the primary address Sadd1/Eadd1 in the address storing unit 13b, the disk apparatus 10 increments the counter value of the secondary address from two to three.

When the disk apparatus 10 receives a read command y from the host computer 100 after receiving the read command 1 and the read command 2, the disk apparatus 10 obtains Saddy indicative of the start point of the data to be read and Eaddy indicative of the end point of the data, included in the read command y. The disk apparatus 10 then stores the obtained address Saddy/Eaddy as the secondary address of the primary addresses Sadd1/Eadd1 and Sadd2/Eadd2 in the address storing unit 13b.

When the disk apparatus 10 receives the read command 3 from the host computer 100 after receiving the read command 1, the read command 2, and the read command y, the disk apparatus 10 obtains Sadd3 indicative of the start point of the data to be read and Eadd3 indicative of the end point of the data, included in the read command 3.

If the obtained address Sadd3/Eadd3 is stored as the secondary address of the primary addresses Sadd1/Eadd1 and Sadd2/Sadd2 in the address storing unit 13b, the disk apparatus 10 increments the counter value of the secondary address from two to three.

The disk apparatus 10 then selects the secondary addresses Sadd2/Eadd2 and Sadd3/Eadd3, of which the counter value indicates the largest number, as the secondary addresses of the primary addresses Sadd1/Eadd1 and Sadd2/Eadd2, respectively.

In FIG. 5C, counter values of both the secondary addresses Sadd2/Eadd2 and Sadd3/Eadd3 corresponding to the primary address Sadd1/Eadd1 indicate three. However, because the secondary address Sadd3/Eadd3 is selected as the secondary address of the primary address Sadd2/Eadd2, the secondary address Sadd2/Eadd2 is selected as the secondary address of the primary address Sadd1/Eadd1.

After selecting the secondary address, upon receipt of the read command 1 from the host computer 100, the disk apparatus 10 reads the data of the secondary address Sadd2/Eadd2 and stores it in the buffer memory 13a in advance. Then, upon receipt of the read command 2 from the host computer 100, the disk apparatus 10 sends the data from the buffer memory 13a to the host computer 100.

Upon receipt of the read command 2 from the host computer 100, the disk apparatus reads the data of the secondary address Sadd3/Eadd3 and stores it in the buffer memory 13a in advance. Then, upon receipt of the read command 3 from the host computer 100, the disk apparatus 10 sends the data from the buffer memory 13a to the host computer 100.

Candidates for the secondary address, which are not received from the host computer 100 immediately after the primary address again, can be deleted from the secondary address information.

In this manner, because the disk apparatus 10 according to the second embodiment selects the address of data to be read after reading the data requested in the read command from the host computer 100 from among a plurality of candidates, the secondary address can be selected more correctly. Furthermore, because the disk apparatus 10 reads the data from the disk 12 in advance, the time to access the data can be reduced.

More specifically, the disk apparatus 10 selects the secondary address more correctly by selecting it from among a plurality of candidates. Based on the correctly selected secondary address, the disk apparatus 10 reads the data from the disk 12 in advance. As a result, because of less possibility of reading a wrong data, the time to access the data can be reduced.

Next, the secondary-address selecting process according to the second embodiment will be explained with reference to FIG. 6. FIG. 6 is a flowchart of the secondary-address selecting process performed by the disk apparatus 10.

Upon receipt of the read command 1 from the host computer 100 (YES at Step S201), the disk apparatus 10 obtains Sadd1 indicative of the start point of the data to be read and Eadd1 indicative of the end point of the data, included in the read command 1 (Step S202).

The disk apparatus 10 determines whether any prior address has been obtained from a read command received from the host computer 100 prior to the read command 1 (Step S203). If there is not any prior address in the storing unit 13 (NO at Step S203), the disk apparatus 10 determines whether there are m prior addresses in the storing unit 13, where m is, for example, three (Step S214).

If there are not three prior addresses in the storing unit 13 (NO at Step S214), the disk apparatus 10 stores the obtained address Sadd1/Eadd1 in the storing unit 13 as the prior address (Step S216).

Upon receipt of the read command 2 from the host computer 100 later (YES at Step S201), the disk apparatus 10 obtains Sadd2 indicative of the start point of the data to be read and Eadd2 indicative of the end point of the data, included in the read command 2 (Step S202).

The disk apparatus 10 determines whether any prior address has been obtained from the read command received from the host computer 100 prior to the read command 2 (Step S203). If the prior address Sadd1/Eadd1 is stored in the storing unit 13 (YES at Step S203), the disk apparatus 10 determines whether the address storing unit 13b stores therein the prior address Sadd1/Eadd1 as the primary address (Step S204).

If the prior address Sadd1/Eadd1 is not stored as the primary address in the address storing unit 13b (NO at Step S204), the disk apparatus 10 stores the prior address Sadd1/Eadd1 as the primary address in the address storing unit 13b (Step S205).

The disk apparatus 10 determines whether there are three prior addresses in the storing unit 13 (Step S214). If there are not three prior addresses (NO at Step S214), the disk apparatus 10 stores the obtained address Sadd2/Eadd2 in the storing unit 13 as the prior address (Step S216).

Upon receipt of the read command 3 from the host computer 100 later (YES at Step S201), the disk apparatus 10 obtains Sadd3 indicative of the start point of the data to be read and Eadd3 indicative of the end point of the data, included in the read command 3 (Step S202).

The disk apparatus 10 determines whether any prior address has been obtained from the read command received from the host computer 100 prior to the read command 3 (Step S203). If the prior addresses Sadd1/Eadd1 and Sadd2/Eadd2 are stored in the storing unit 13 (YES at Step S203), the disk apparatus 10 determines whether the address storing unit 13b stores therein the prior addresses Sadd1/Eadd1 and Sadd2/Eadd2 as the primary address (Step S204).

If the prior address Sadd2/Eadd2 is not stored as the primary address in the address storing unit 13b (NO at Step S204), the disk apparatus 10 stores the prior address Sadd2/Eadd2 as the primary address in the address storing unit 13b (Step S205).

The disk apparatus 10 determines whether there are three prior addresses in the storing unit 13 (Step S214). If there are not three prior addresses (NO at Step S214), the disk apparatus 10 stores the obtained address Sadd3/Eadd3 in the storing unit 13 as the prior address (Step S216).

Upon receipt of the read command 4 from the host computer 100 later (YES at Step S201), the disk apparatus 10 obtains Sadd4 indicative of the start point of the data to be read and Eadd4 indicative of the end point of the data, included in the read command 4 (Step S202).

The disk apparatus 10 determines whether any prior address has been obtained from the read command received from the host computer 100 prior to the obtained address Sadd4/Eadd4 in the read command 4 (Step S203). If the prior addresses Sadd1/Eadd1, Sadd2/Eadd2, and Sadd3/Eadd3 are stored in the storing unit 13 (YES at Step S203), the disk apparatus 10 determines whether the address storing unit 13b stores therein the prior addresses Sadd1/Eadd1, Sadd2/Eadd2, and Sadd3/Eadd3 as the primary address (Step S204).

If the prior address Sadd3/Eadd3 is not stored as the primary address in the address storing unit 13b (NO at Step S204), the disk apparatus 10 stores the prior address Sadd3/Eadd3 as the primary address in the address storing unit 13b (Step S205).

The disk apparatus 10 determines whether there are three prior addresses in the storing unit 13 (Step S214). If there are three prior addresses in the storing unit 13 (YES at Step S214), the disk apparatus 10 deletes the oldest address Sadd1/Eadd1 (Step S215), and stores the obtained address Sadd4/Eadd4 in the storing unit 13 as the prior address (Step S216).

When the disk apparatus 10 receives the read command 2 after receiving the read command 1 (YES at Step S201), the disk apparatus 10 obtains Sadd2 indicative of the start point of the data to be read and Eadd2 indicative of the end point of the data, included in the read command 2 (Step S202).

The disk apparatus 10 determines whether any prior address has been obtained from the read command received from the host computer 100 prior to the obtained address Sadd2/Eadd2 in the read command 2 (Step S203). If the prior address Sadd1/Eadd1 is stored in the storing unit 13 (YES at Step S203), the disk apparatus 10 determines whether the address storing unit 13b stores therein the prior address Sadd1/Eadd1 as the primary address (Step S204).

If the prior address Sadd1/Eadd1 is stored as the primary address in the address storing unit 13b (YES at Step S204), the disk apparatus 10 determines whether the obtained address Sadd2/Eadd2 is stored as the secondary address of the primary address Sadd1/Eadd1 in the address storing unit 13b (Step S206).

If the obtained Sadd2/Eadd2 is not stored as the secondary address in the address storing unit 13b (NO at Step S206), the disk apparatus 10 stores it as the secondary address of the primary address Sadd1/Eadd1 (Step S207). By repeating the above process upon receipt of a read command from the host computer 100, the disk apparatus 10 stores the address obtained from the commands as the secondary address in the address storing unit 13b.

When the disk apparatus 10 receives the read command 2 after receiving the read command 1, if the obtained address Sadd2/Eadd2 is stored as the secondary address in the address storing unit 13b (YES at Step S206), the disk apparatus 10 increments the counter value of the secondary address Sadd2/Eadd2 from one to two (Step S208). By repeating the above process upon receipt of a read command from the host computer 100, the disk apparatus 10 increments the counter value of the secondary address.

The disk apparatus 10 then determines whether there is a plurality of candidates for the secondary address (Step S209). If there is a plurality of candidates for the secondary address (YES at Step S209), the disk apparatus 10 calculates an address of which the counter value indicates the largest number (Step S210). The disk apparatus 10 determines whether there is only one address of which the counter value indicates the largest number (Step S211). If there is only one such address (YES at Step S211), the disk apparatus 10 selects the address as the secondary address of the prior address, i.e., the primary address (Step S212). The disk apparatus 10 performs the above process on all m prior addresses (NO at Step S213). If the process has been performed on all the m prior addresses (YES at Step S213), the process proceeds to Step S214.

In this manner, because the disk apparatus 10 according to the second embodiment selects the address of data to be read after reading the data requested in the read command from the host computer 100 from among a plurality of candidates, the secondary address can be selected more correctly. Furthermore, because the disk apparatus 10 suppresses probability of reading a wrong data by selecting the secondary address more correctly, capacity of the buffer memory 13a that temporarily stores therein the data can be minimized.

According to the first and the second embodiments, the disk apparatus generates the address information in the address storing unit and selects the secondary address based on the read address. However, the disk apparatus can be configured to generate the address information based on write commands and select the secondary address based on read commands.

Figure 7A:
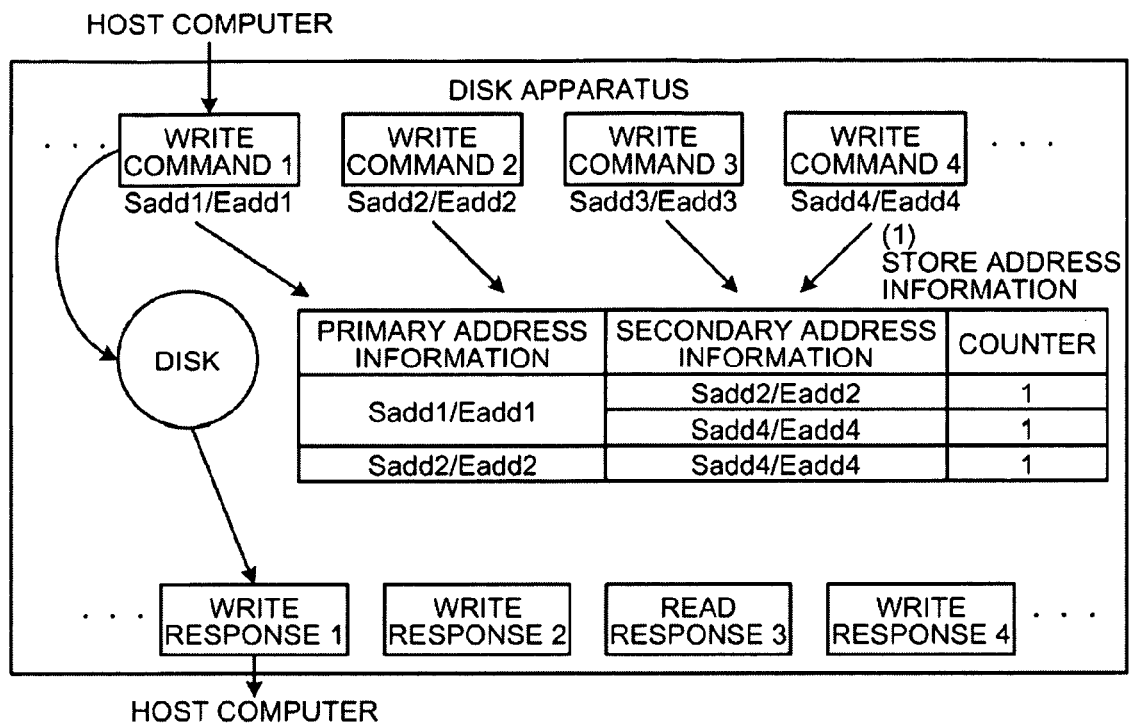
FIGS. 7A and 7B are schematic diagrams for explaining an overview and characteristics of a disk apparatus according to a third embodiment of the present invention.
Figure 7B:
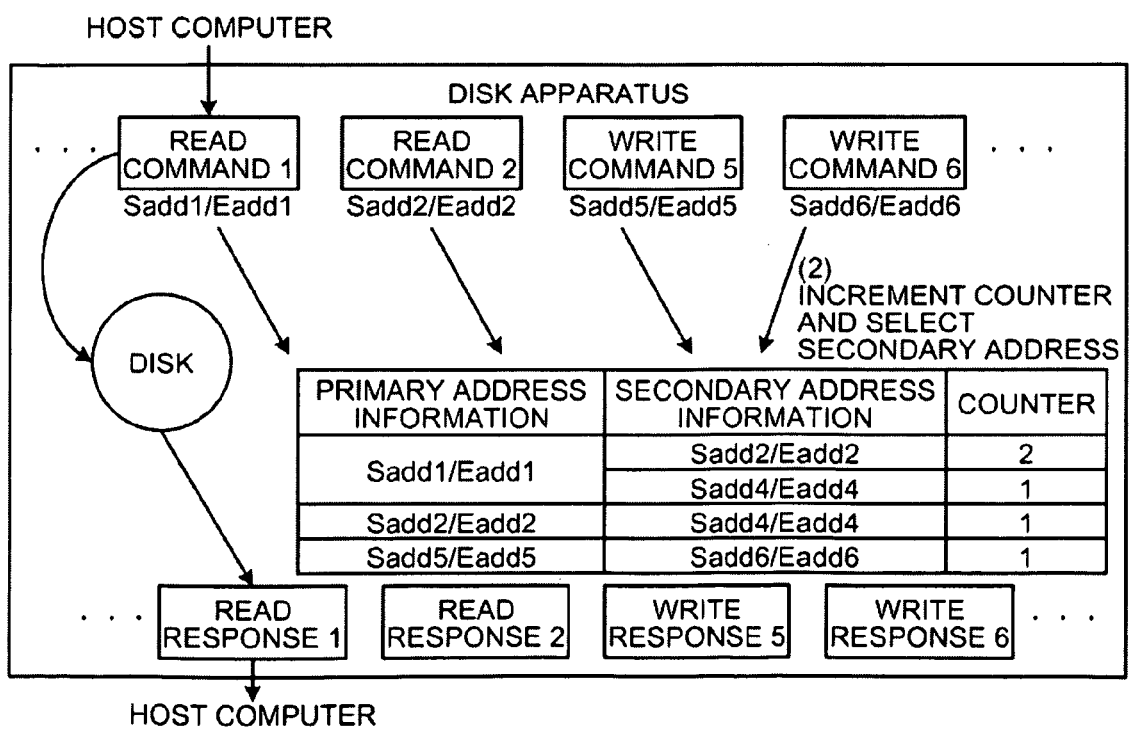
Figure 8:
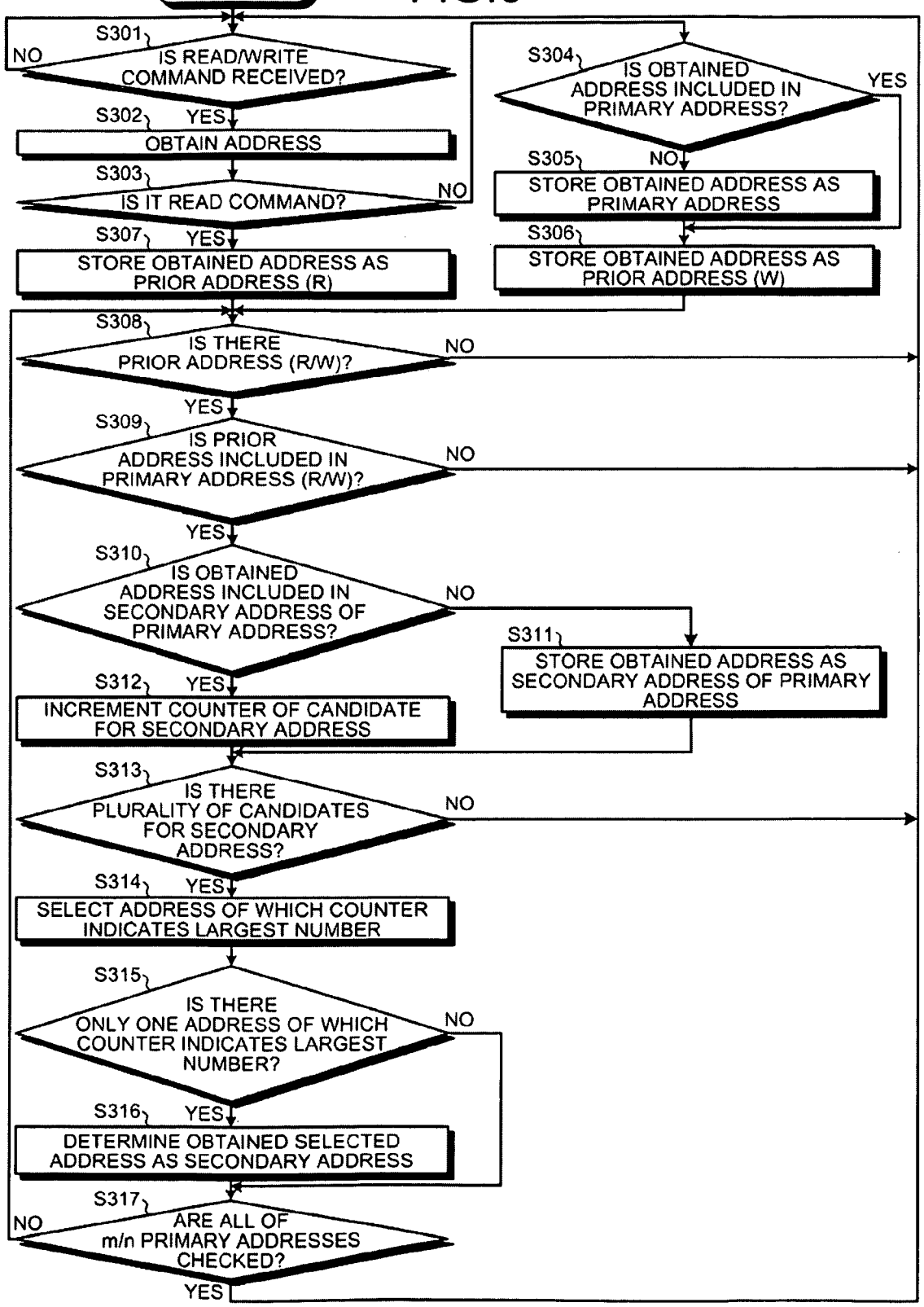
FIG. 8 is a flowchart of the secondary-address selecting process performed by the disk apparatus according to the third embodiment.

FIGS. 7A and 7B are schematic diagrams for explaining an overview and characteristics of a disk apparatus according to a third embodiment of the present invention. FIG. 8 is a flowchart of the secondary-address selecting process performed by the disk apparatus according to the third embodiment. Because the disk apparatus 10 according to the third embodiment has the same configuration as the disk apparatus according to the first embodiment, the explanation thereof is omitted, and an explanation is given focusing on the process of storing and selecting the secondary address, which is different from that in the first embodiment, using the same reference numerals as in the first embodiment.

As shown in FIG. 7A, upon receipt of a write command from the external device, the disk apparatus 10 obtains an address included in the write command, which indicates the start point and the end point of data to be written. If the obtained address is not stored as the primary address in the address storing unit, the disk apparatus 10 stores the obtained address as the primary address in the address storing unit. Furthermore, if the obtained address is not stored as the secondary address, the disk apparatus 10 stores the obtained address up to the predetermined number as the secondary address of the corresponding primary address in the address storing unit (see (1) in FIG. 7A).

More specifically, when the disk apparatus 10 receives a write command 1 from the host computer 100, the disk apparatus 10 obtains Sadd1 indicative of the start point of the data to be written and Eadd1 indicative of the end point of the data, which are included in the write command 1. If the obtained address Sadd1/Eadd1 is not stored as the primary address in the address storing unit 13b, the disk apparatus 10 stores the obtained address Sadd1/Eadd1 as the primary address in the address storing unit 13b.

The disk apparatus 10 then receives a write command 2 from the host computer 100, and obtains Sadd2 indicative of the start point of the data to be written and Eadd2 indicative of the end point of the data, which are included in the write command 2. If the obtained address Sadd2/Eadd2 is not stored as the primary address in the address storing unit 13b, the disk apparatus 10 stores the obtained address Sadd2/Eadd2 as the primary address in the address storing unit 13b.

Furthermore, if the obtained address Sadd2/Eadd2 is not stored as the secondary address of the primary address Sadd1/Eadd1, the disk apparatus 10 stores the obtained address Sadd2/Eadd2 as the secondary address of the primary address Sadd1/Eadd1 in the address storing unit 13b.

The disk apparatus 10 receives the read command 3 and then a write command 4 from the host computer 100, and obtains Sadd4 indicative of the start point of the data to be written and Eadd4 indicative of the end point of the data, which are included in the write command 4. If the obtained address Sadd4/Eadd4 is not stored as the primary address in the address storing unit 13b, the disk apparatus 10 stores the obtained address Sadd4/Eadd4 as the primary address in the address storing unit 13b.

If the obtained address Sadd4/Eadd4 is not stored as the secondary address of the primary addresses Sadd1/Eadd1 and Sadd2/Eadd2 in the address storing unit 13b, the disk apparatus 10 stores the obtained address Sadd4/Eadd4 as the secondary address of the primary addresses Sadd1/Eadd1 and Sadd2/Eadd2 in the address storing unit 13b.

When the disk apparatus 10 receives a read command from the external device, the disk apparatus 10 obtains the address indicative of the start point and the end point of the data to be read. If the obtained address is stored as the secondary address of the corresponding primary address in the address storing unit, the disk apparatus 10 increments the counter value of the secondary address. The disk apparatus 10 then selects a secondary address of which the counter value indicates the largest number (see (2) in FIG. 7B).

More specifically, when the disk apparatus 10 receives the read command 2 from the host computer 100 after receiving the read command 1, the disk apparatus 10 obtains Sadd2 indicative of the start point of the data to be read and Eadd2 indicative of the end point of the data, which are included in the read command 2.

If the obtained address Sadd2/Eadd2 is stored as the secondary address of the primary address Sadd1/Eadd1 in the address storing unit 13b, the disk apparatus 10 increments the counter value of the secondary address in the address storing unit 13b from one to two. The disk apparatus 10 then selects the obtained address Sadd2/Eadd2, of which the counter value indicates the largest number, as the secondary address of the primary address Sadd1/Eadd1. When the disk apparatus 10 receives other commands such as a write command 5 and a read command 6 from the host computer 100, the disk apparatus 10 stores the addresses obtained from the commands in the address storing unit 13b in the same manner.

As in the first and the second embodiments, when the disk apparatus 10 receives the read command 1 from the host computer after selecting the secondary address Sadd2/Eadd2, the disk apparatus 10 reads the data of the secondary address Sadd2/Eadd2 and stores it in the buffer memory 13a in advance.

Then, upon receipt of the read command 2 from the host computer 100, from which Sadd2/Eadd2 is obtained, the disk apparatus 10 sends the data of the secondary address Sadd2/Eadd2 with respect to the primary address Sadd1/Eadd1 from the buffer memory 13a to the host computer 100.

Next, the secondary-address selecting process according to the third embodiment will be explained with reference to FIG. 8. FIG. 8 is a flowchart of the secondary-address selecting process performed by the disk apparatus 10 according to the third embodiment.

In FIG. 8, a prior address with respect to a read command is called a prior address (R), and n represents the number of the column of a table, where the prior address (R) is stored. Similarly, a prior address with respect to a write command is called a prior address (W), and m represents the number of the column of a table, where the prior address (W) is stored. A case of receiving a write command from the host computer 100 is explained first, and then a case of receiving a read command is explained.

Upon receipt of the write command 1 from the host computer 100 (YES at Step S301), the disk apparatus 10 obtains the address Sadd1/Eadd1 from the write command 1 (Step S302). The disk apparatus 10 determines whether the received command is a read command (Step S303).

If the received command is a write command (NO at Step S303), the disk apparatus 10 determines whether the address storing unit 13b stores therein the obtained address Sadd1/Eadd1 as the primary address (Step S304). If the obtained address Sadd1/Eadd1 is not stored as the primary address in the address storing unit 13b (NO at Step S304), the disk apparatus 10 stores the obtained address Sadd1/Eadd1 as the primary address in the address storing unit 13b (Step S305).

The disk apparatus 10 stores the obtained address Sadd1/Eadd1 as the prior address (W) with respect to the write command in the storing unit 13 (Step S306). On the other hand, if the obtained address Sadd1/Eadd1 is stored as the primary address in the address storing unit 13b (YES at Step S304), the disk apparatus 10 does not store the obtained address Sadd1/Eadd1 as the primary address, and immediately stores the obtained address Sadd1/Eadd1 as the prior address (W) with respect to the write command in the storing unit 13 (Step S306).

The disk apparatus 10 determines whether there is any prior address (W) in the storing unit 13 (Step S308). If there is the prior address (W) (YES at Step S308), the disk apparatus 10 determines whether the prior address (W) is stored as the primary address in the address storing unit 13b (Step S309).

If the prior address (W) is stored as the primary address in the address storing unit 13b (YES at Step S309), the disk apparatus 10 determines whether the obtained address Sadd1/Eadd1 is stored as the secondary address of the corresponding primary address in the address storing unit 13b (Step S310).

If the obtained address Sadd1/Eadd1 is not stored as the secondary address in the address storing unit 13b (NO at Step S310), the disk apparatus 10 stores the obtained address Sadd1/Eadd1 as the secondary address of the corresponding primary address with respect to the prior address in the address storing unit 13b (Step S311). If the obtained address Sadd1/Eadd1 is stored as the secondary address in the address storing unit 13b (YES at Step S310), the disk apparatus 10 increments the counter value of the secondary address Sadd1/Eadd1 (Step S312).

If there is a plurality of candidates for the secondary address in the address storing unit 13b (YES at Step S313), the disk apparatus 10 calculates an address of which the counter value indicates the largest number (Step S314). The disk apparatus 10 determines whether there is only one address of which the counter value indicates the largest number (Step S315).

If there is only one such address (YES at Step S315), the disk apparatus 10 selects the address as the secondary address of the prior address, i.e., the primary address (Step S316). The disk apparatus 10 performs the above process on all m prior addresses (NO at Step S317). If the process has been performed on all the m prior addresses (YES at Step S317), the process returns to Step S301.

On the other hand, when the disk apparatus 10 receives the read command 1 from the host computer 100 (YES at Step S301), the disk apparatus 10 obtains the address Sadd1/Eadd1 from the read command 1 (Step S302). The disk apparatus 10 determines whether the received command is a read command (Step S303).

If the received command is a read command (YES at Step S303), the disk apparatus 10 stores the obtained address Sadd1/Eadd1 as the prior address (R) in the storing unit 13 (Step S307).

The disk apparatus 10 determines whether there is any prior address (R) in the storing unit 13 (Step S308). If there is the prior address (R) (YES at Step S308), the disk apparatus 10 determines whether the prior address (R) is stored as the primary address in the address storing unit 13b (Step S309).

If the prior address (R) is stored as the primary address in the address storing unit 13b (YES at Step S309), the disk apparatus 10 determines whether the obtained address Sadd1/Eadd1 is stored as the secondary address of the corresponding primary address in the address storing unit 13b (Step S310).

If the obtained address Sadd1/Eadd1 is not stored as the secondary address in the address storing unit 13b (NO at Step S310), the disk apparatus 10 stores the obtained address Sadd1/Eadd1 as the secondary address of the corresponding primary address with respect to the prior address in the address storing unit 13b (Step S311). If the obtained address Sadd1/Eadd1 is stored as the secondary address in the address storing unit 13b (YES at Step S310), the disk apparatus 10 increments the counter value of the secondary address Sadd1/Eadd1 (Step S312).

If there is a plurality of candidates for the secondary address in the address storing unit 13b (YES at Step S313), the disk apparatus 10 calculates an address of which the counter value indicates the largest number (Step S314). The disk apparatus 10 determines whether there is only one address of which the counter value indicates the largest number (Step S315).

If there is only one such address (YES at Step S315), the disk apparatus 10 selects the address as the secondary address of the prior address, i.e., the primary address (Step S316). The disk apparatus 10 performs the above process on all n prior addresses (NO at Step S317). If the process has been performed on all the n prior addresses (YES at Step S317), the process returns to Step S301.

In this manner, because the disk apparatus 10 according to the third embodiment selects the address of data to be read after reading the data requested in the read command from the host computer 100 from among both read commands and write commands, the secondary address can be selected more quickly.

More specifically, taking advantage of the fact that the data cannot be requested by the read command unless it has been written based on the write command from the host computer 100, the disk apparatus 10 generates the address information in the address storing unit 13b, increments the counter value of the secondary address, and selects the secondary address based on the write command received from the host computer 100, thereby quickly selecting the secondary address.

The present invention can be utilized in various modifications other than the embodiments described above. Examples of modified configuration of the disk apparatus and a computer program are described below.

The processing procedures, the control procedures, the names, the information including various data and parameters, such as the information shown in FIG. 2, which are described above or shown in the drawings, can be modified unless otherwise specified.

The constituents of the apparatus shown in the drawings are based on the conceptional functions, and the apparatus does not need to be physically configured as shown in the drawings. In other words, a part or all of a constituent can be functionally or physically separated or integrated as needed depending on the circumstance. For example, the command processing unit 14a can be separated into an address obtaining unit that obtains an address from a read/write command, an address processing unit that stores the obtained address in the address storing unit 13b, a counter processing unit that increments the counter value in the address storing unit 13b based on the obtained address, and a secondary-address selecting unit that selects the secondary address of which the counter value indicates the largest number. Furthermore, a part or all of the processings performed in the apparatus can be utilized in the form of a central processing unit (CPU), a computer program executed by the CPU, or wired logic hardware.

In the above embodiments, the processings are performed by hardware logic. However, the present invention is not limited to the hardware logic, and it can be utilized by executing a computer program. An example of a computer that executes an advance data-reading program, which includes the same functions as the disk apparatus 10, is explained below.

Figure 9:
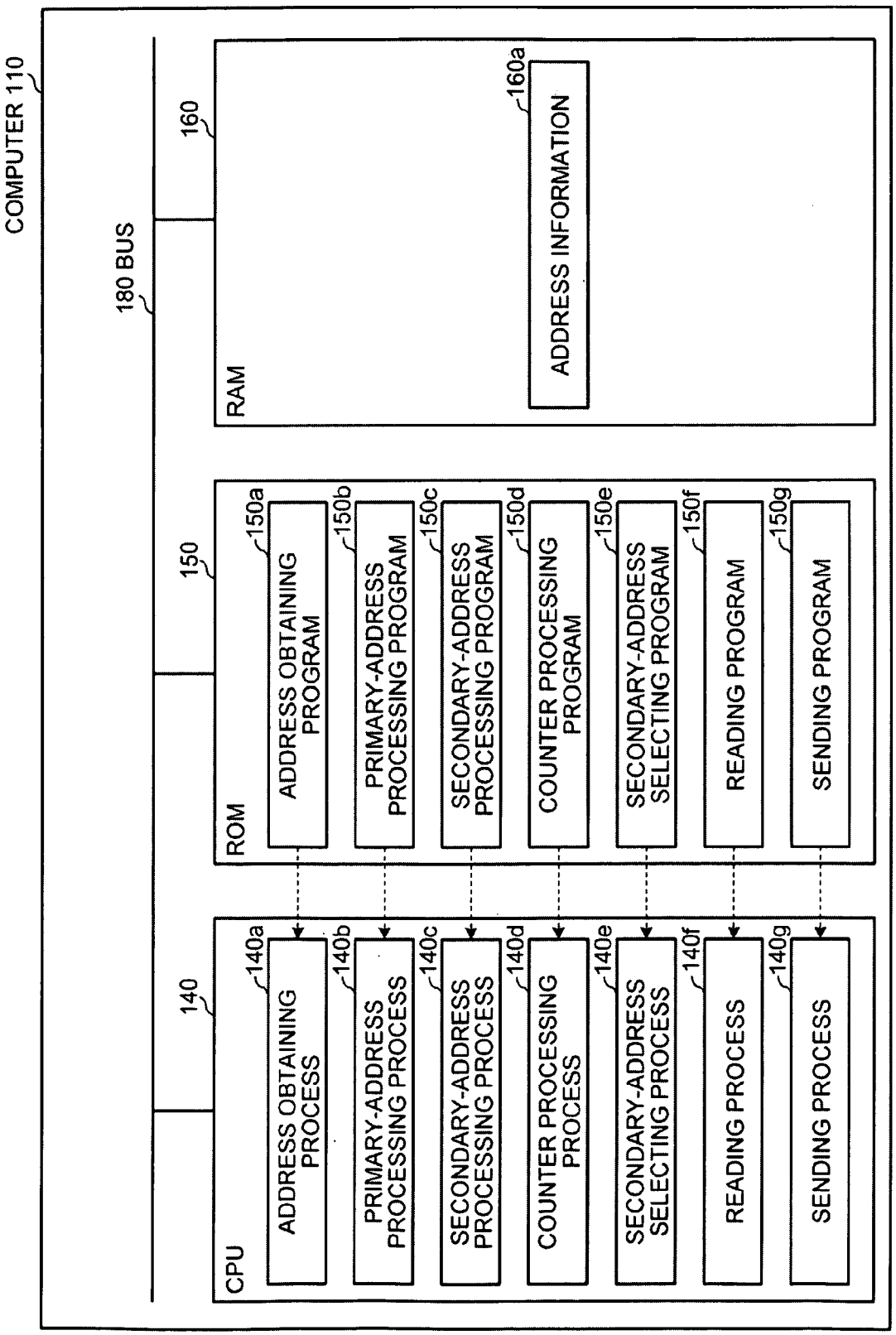
FIG. 9 is a block diagram of a computer that executes an advance data-reading program.
Figure 10A:
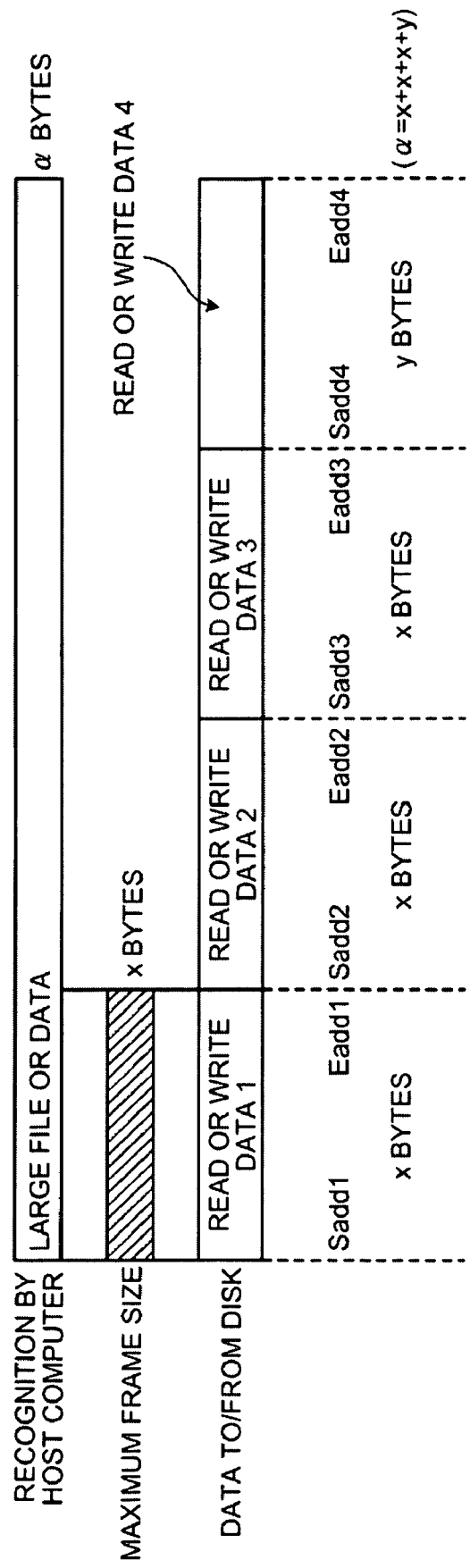
FIGS. 10A to 10D are schematic diagrams for explaining a process of reading data from and writing data to a disk apparatus according to a conventional technology.
Figure 10B:
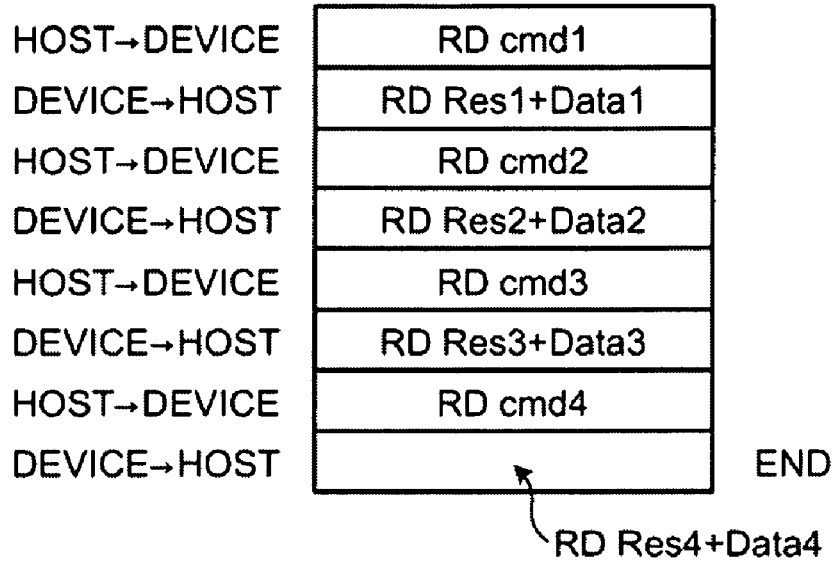
Figure 10C:
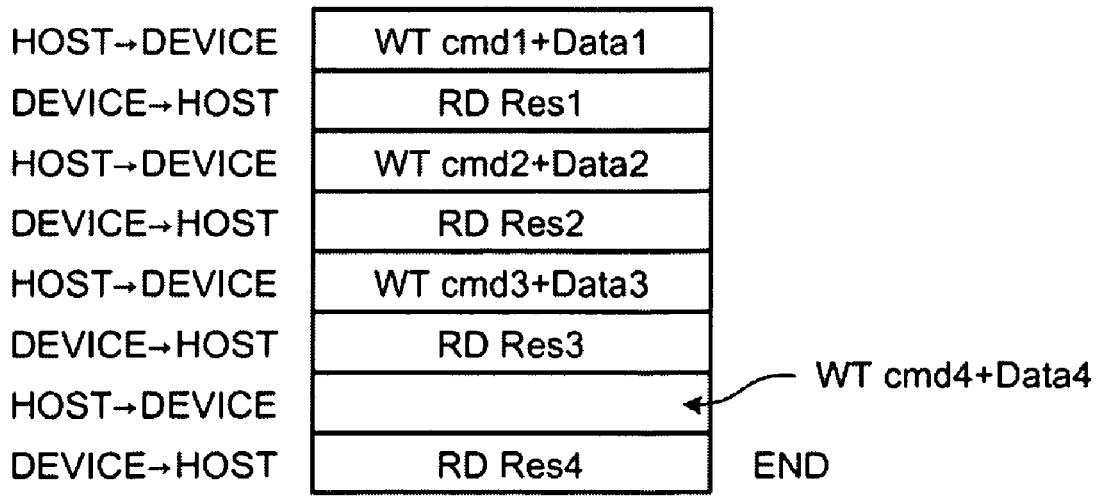
Figure 10D:
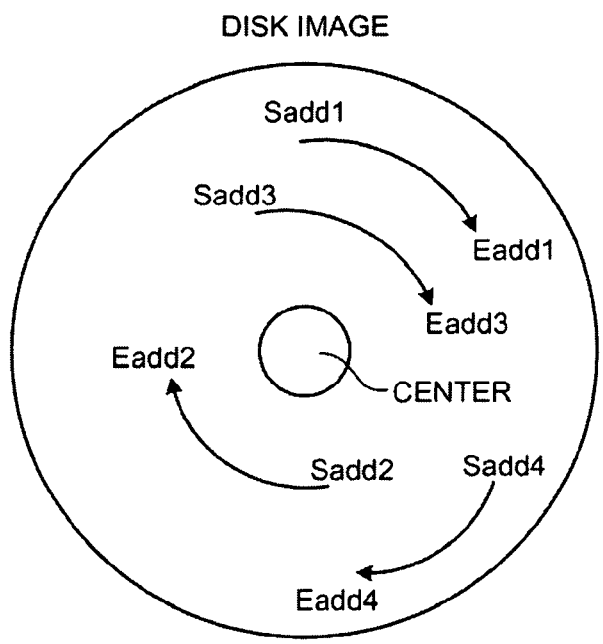
Figure 11:
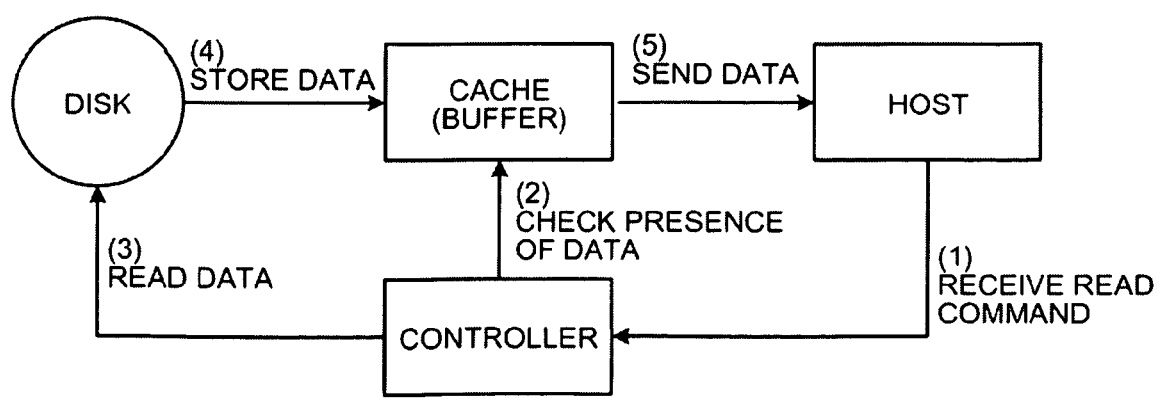
FIG. 11 is a schematic diagram for explaining a configuration of the disk apparatus according to the conventional technology.

FIG. 9 is a block diagram of a computer that executes the advance data-reading program. A computer 110 includes a CPU 140, a read only memory (ROM) 150, and a random access memory (RAM) 160, connected to one another with a bus 180.

The ROM 150 stores therein the advance data-reading program that includes an address obtaining program 150a, a primary-address processing program 150b, a secondary-address processing program 150c, a counter processing program 150d, a secondary-address selecting program 150e, a reading program 150f, and a sending program 150g as shown in FIG. 9. The programs 150a to 150g can be integrated or separated as needed, like the constituents in the disk apparatus 10 shown in FIG. 2.

The CPU 140 reads the programs 150a to 150g from the ROM 150 and executes them so that they function as an address obtaining process 140a, a primary-address processing process 140b, a secondary-address processing process 140c, a counter processing process 140d, a secondary-address selecting process 140e, a reading process 140f, and a sending process 140g. The processes 140a to 140g are equivalent to the command processing unit 14a, the reading unit 14b, and the sending unit 14c shown in FIG. 2.

The CPU 140 executes the advance data-reading program based on an address information 160a stored in the RAM 160.

The disk apparatus according to the embodiments of the present invention can reduce the time to access the data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A disk apparatus connected to an external device that sends a read command to read data or a write command to write the data, and adapted to read the data from or write the data in a disk in response to the read command or the write command, the disk apparatus comprising:
    an address storing unit that stores therein a primary address indicative of a start point and an end point of data to be read, which is obtained from the read command or the write command received from the external device, a secondary address indicative of the start point and the end point of data to be read after the data read based on the primary address, and a counter value indicative of a number of times of receiving the read command for the secondary address with respect to the primary address;
    an address obtaining unit that obtains an address upon receipt of the read command from the external device, and determines whether the obtained address is stored as the primary address in the address storing unit and whether the obtained address is stored as the secondary address of a corresponding primary address in the address storing unit;
    a primary-address processing unit that, if the address obtained by the address obtaining unit is not stored as the primary address in the address storing unit, stores the obtained address as the primary address in the address storing unit;
    a secondary-address processing unit that, if the address obtained by the address obtaining unit is not stored as the secondary address of the corresponding primary address in the address storing unit, stores the obtained address as the secondary address associated with the corresponding primary address in the address storing unit, after the primary address is stored by the primary-address processing unit;
    a counter processing unit that, if the address obtained by the address obtaining unit is stored as the secondary address of the corresponding primary address in the address storing unit, increments the counter value of the secondary address, after the secondary-address processing unit stores the obtained address as the secondary address in the address storing unit;
    a secondary-address selecting unit that selects the secondary address of which the counter value indicates a largest number after the increment of the counter value by the counter processing unit;
    a reading unit that reads the data based on the secondary address of the corresponding primary address from the disk, and stores the read data in a buffer memory, if the address obtaining unit obtains the address after the secondary-address selecting unit selects the secondary address of the data to be read immediately after the data specified by the primary address; and
    a sending unit that sends the data of the secondary address stored in the buffer memory by the reading unit to the external device, if the address obtaining unit obtains the secondary address of the data read by the reading unit.

2. The disk apparatus according to claim 1, wherein, if a predetermined number of addresses obtained by the address obtaining unit is not stored as the secondary address of the corresponding primary address in the address storing unit after the primary-address processing unit stores the primary address, the secondary-address processing unit stores the predetermined number of the addresses as the secondary address associated with the corresponding primary address in the address storing unit.

3. The disk apparatus according to claim 2, wherein, after the secondary-address processing unit stores the predetermined number of the addresses as the secondary address associated with the corresponding primary address, if the address obtained by the address obtaining unit is stored as the secondary address of the corresponding primary address, the counter processing unit increments the counter value of the secondary address, and, if the address obtained by the address obtaining unit is not received as the secondary address of the corresponding primary address successively, the counter processing unit deletes the secondary address.

4. The disk apparatus according to claim 1, wherein
    upon receipt of the read command or the write command from the external device, the address obtaining unit obtains the address, and determines whether the obtained address is stored as the primary address in the address storing unit and whether the obtained address is stored as the secondary address of the corresponding primary address in the address storing unit,
    if the address obtained by the address obtaining unit from the write command is not stored as the primary address in the address storing unit, the primary-address processing unit stores the obtained address as the primary address in the address storing unit, if a predetermined number of addresses obtained by the address obtaining unit from the write command is not stored as the secondary address of the corresponding primary address in the address storing unit after the primary-address processing unit stores the address as the primary address, the secondary-address processing unit stores the predetermined number of the addresses as the secondary address associated with the corresponding primary address in the address storing unit, and if the address obtained by the address obtaining unit from the read command is stored as the secondary address of the corresponding primary address after the secondary-address processing unit stores the predetermined number of the addresses as the secondary address associated with the corresponding primary address, the counter processing unit increments the counter value of the secondary address.

5. An advance data reading method for a disk apparatus connected to an external device that sends a read command to read data or a write command to write the data, and adapted to read the data from or write the data in a disk in response to the read command or the write command, the advance data reading method comprising:

storing a primary address indicative of a start point and an end point of data to be read, which is obtained from the read command or the write command received from the external device, a secondary address indicative of the start point and the end point of data to be read after the data read based on the primary address, and a counter value indicative of a number of times of receiving the read command for the secondary address with respect to the primary address;

obtaining an address upon receipt of the read command from the external device;

determining whether the obtained address is stored as the primary address and whether the obtained address is stored as the secondary address of a corresponding primary address;

storing, if the obtained address is not stored as the primary address, the obtained address as the primary address;

storing, if the obtained address is not stored as the secondary address of the corresponding primary address, the obtained address as the secondary address associated with the corresponding primary address, after the primary address is stored;

incrementing, if the obtained address is stored as the secondary address of the corresponding primary address, the counter value of the secondary address, after the obtained address is stored as the secondary address;

selecting the secondary address of which the counter value indicates a largest number after the increment of the counter value;

reading the data based on the secondary address of the corresponding primary address from the disk, and storing the read data in a buffer memory, if the address is obtained after selecting the secondary address of the data to be read immediately after the data specified by the primary address; and sending the data of the secondary address in the buffer memory to the external device, if the secondary address of the read data is obtained.

* * * * *